(12) United States Patent
Haxton et al.

(10) Patent No.: US 12,480,893 B2
(45) Date of Patent: Nov. 25, 2025

(54) OPTICAL AND X-RAY METROLOGY METHODS FOR PATTERNED SEMICONDUCTOR STRUCTURES WITH RANDOMNESS

(71) Applicant: KLA Corporation, Milpitas, CA (US)

(72) Inventors: Daniel James Haxton, Fremont, CA (US); Christopher Liman, San Jose, CA (US); Inkyo Kim, Cupertino, CA (US); Boxue Chen, San Jose, CA (US); Hyowon Park, Milpitas, CA (US); Thaddeus Gerard Dziura, San Jose, CA (US); Nakyoon Kim, Hwaseong-si (KR); Houssam Chouaib, Milpitas, CA (US); Anderson Chou, Hillsboro, OR (US); Dimitry Sanko, Vallejo, CA (US)

(73) Assignee: KLA Corporation, Milpitas, CA (US)

( * ) Notice: Subject to any disclaimer, the term of this patent is extended or adjusted under 35 U.S.C. 154(b) by 21 days.

(21) Appl. No.: 18/430,350

(22) Filed: Feb. 1, 2024

(65) Prior Publication Data
US 2025/0146961 A1    May 8, 2025

Related U.S. Application Data

(60) Provisional application No. 63/595,761, filed on Nov. 3, 2023.

(51) Int. Cl.
*G01N 23/20* (2018.01)
*G01N 21/95* (2006.01)

(52) U.S. Cl.
CPC ......... *G01N 23/20* (2013.01); *G01N 21/9501* (2013.01)

(58) Field of Classification Search
CPC .................... G01N 23/20; G01N 21/9501
See application file for complete search history.

(56) References Cited

U.S. PATENT DOCUMENTS

| 4,999,014 A | 3/1991 | Gold et al. |
| 5,181,080 A | 1/1993 | Fanton et al. |

(Continued)

FOREIGN PATENT DOCUMENTS

| CN | 112733451 A | * | 4/2021 | ............. G06N 20/10 |

OTHER PUBLICATIONS

Gross et al., "Modeling of line roughness and its impact on the diffraction intensities and the reconstructed critical dimensions in scatterometry," Applied Optics, vol. 51, No. 30 (Oct. 2012), pp. 7384-7394.

(Continued)

*Primary Examiner* — Tung S Lau
(74) *Attorney, Agent, or Firm* — Entropy Matters LLC

(57) ABSTRACT

Methods and systems for determining random variation in one or more structures on a specimen are provided. One method includes determining characteristic(s) of output generated by an output acquisition subsystem for structure(s) formed on a specimen and simulating the characteristic(s) of the output with initial parameter values for the structure(s). The method also includes determining parameter values of the structure(s) formed on the specimen as the initial parameter values that resulted in the simulated characteristic(s) that best match the determined characteristic(s). The determined parameter values are responsive to random variation in parameter(s) of the structure(s) on the specimen.

39 Claims, 10 Drawing Sheets

(56) References Cited

U.S. PATENT DOCUMENTS

| | | | |
|---|---|---|---|
| 5,608,526 | A | 3/1997 | Piwonka-Corle et al. |
| 5,859,424 | A | 1/1999 | Norton et al. |
| 5,877,859 | A | 3/1999 | Aspnes et al. |
| 6,429,943 | B1 | 8/2002 | Opsal et al. |
| 6,515,746 | B2 | 2/2003 | Opsal et al. |
| 6,996,492 | B1 | 2/2006 | Testoni |
| 7,478,019 | B2 | 1/2009 | Zangooie et al. |
| 7,929,667 | B1 | 4/2011 | Zhuang et al. |
| 7,933,026 | B2 | 4/2011 | Opsal et al. |
| 9,291,554 | B2 | 3/2016 | Kuznetsov et al. |
| 9,885,962 | B2 | 2/2018 | Veldman et al. |
| 9,915,522 | B1 | 3/2018 | Jiang et al. |
| 10,013,518 | B2 | 7/2018 | Bakeman et al. |
| 10,101,670 | B2 | 10/2018 | Pandev et al. |
| 10,101,676 | B2 | 10/2018 | Fu et al. |
| 10,324,050 | B2 | 6/2019 | Hench et al. |
| 10,352,695 | B2 | 7/2019 | Dziura et al. |
| 11,698,251 | B2 | 7/2023 | Shchegrov et al. |
| 2002/0113966 | A1 | 8/2002 | Shchegrov et al. |
| 2008/0055609 | A1 | 3/2008 | Finarov et al. |
| 2008/0249754 | A1 | 10/2008 | Niu et al. |
| 2014/0172394 | A1 | 6/2014 | Kuznetsov et al. |
| 2015/0046121 | A1 | 2/2015 | Dziura et al. |
| 2018/0106735 | A1* | 4/2018 | Gellineau .............. G01B 15/04 |
| 2019/0017946 | A1 | 1/2019 | Wack et al. |
| 2019/0178788 | A1 | 6/2019 | Nguyen et al. |
| 2022/0044391 | A1* | 2/2022 | Wallingford ........... G06N 3/047 |
| 2024/0168388 | A1 | 5/2024 | Mathijssen et al. |

OTHER PUBLICATIONS

Herrero et al., "Fingerprinting the type of line edge roughness," Modeling Aspects in Optical Metrology VI. vol. 10330, SPIE Optical Metrology 2017 (Jun. 2017), 9 pages.

Herrero et al. "EUV-angle resolved scatter (EUV-ARS): a new tool for the characterization of nanometre structures," Metrology, inspection, and process control for microlithography XXXII, vol. 10585, SPIE, Mar. 2018, 9 pages.

Herrero et al. "Applicability of the Debye-Waller damping factor for the determination of the line-edge roughness of lamellar gratings," Optics Express, vol. 27, No. 22 (Oct. 2019), pp. 32490-32507.

Kato et al., "Effect of line roughness on the diffraction intensities in angular resolved scatterometry," Applied Optics, vol. 49, No. 31 (Nov. 2010), pp. 6102-6110.

Kline et al., "X-ray scattering critical dimensional metrology using a compact x-ray source for next generation semiconductor devices," Journal of Micro/Nanolithograpy, MEMS, and MOEMS, 16(1), 014001 (Jan.-Mar. 2017), 10 pages.

Lemaillet et al., "Intercomparison between optical and x-ray scatterometry measurements of FinFET structures," Proc. SPIE 8681, Metrology, Inspection, and Process Control for Microlithographyh XXVII, 86810Q (Apr. 2013).

International Search Report and Written Opinion for PCT/US2024/053488 mailed Feb. 10, 2025.

* cited by examiner

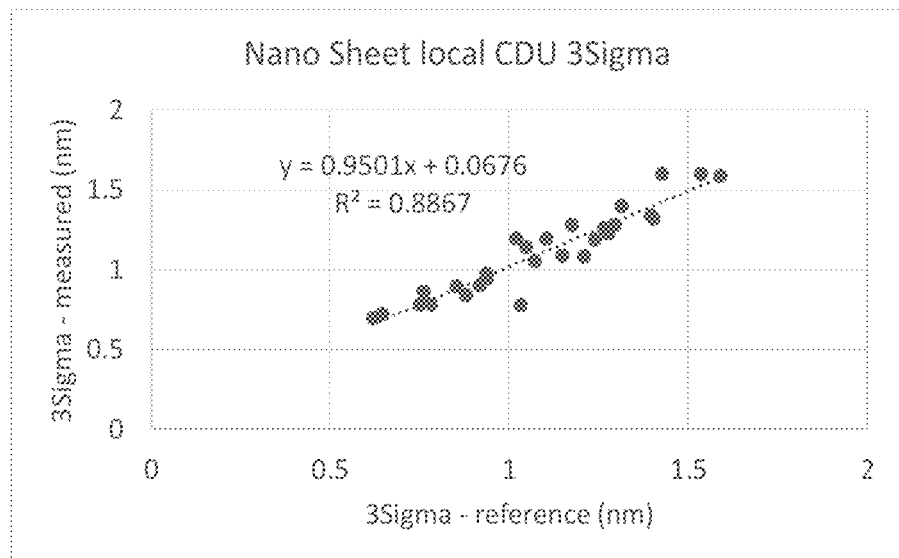
Fig. 12
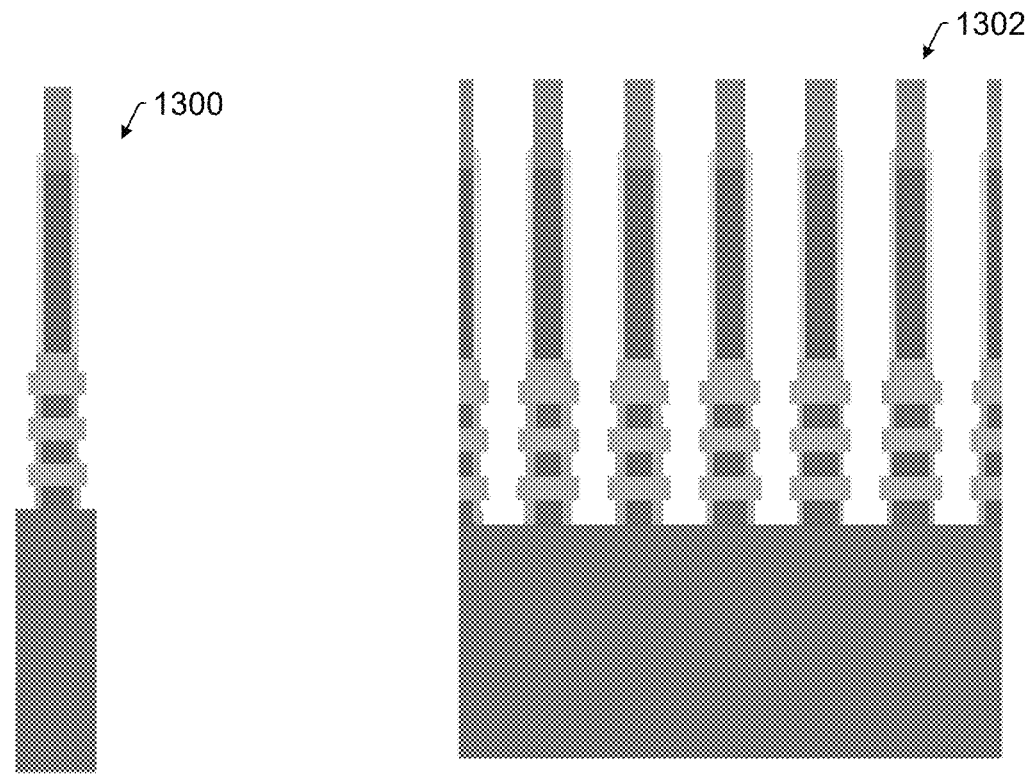
Fig. 13A
Fig. 13B

OPTICAL AND X-RAY METROLOGY METHODS FOR PATTERNED SEMICONDUCTOR STRUCTURES WITH RANDOMNESS

BACKGROUND OF THE INVENTION

1. Field of the Invention

The present invention generally relates to methods and systems for determining information for a specimen. Certain embodiments relate to optical and x-ray metrology methods for patterned semiconductor structures with randomness.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Metrology processes are used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Metrology methods and tools may vary in hardware and/or software. In addition, the metrology methods and tools may vary depending on what type of measurements that they will be used for. Because of the nature of the semiconductor structures that currently need to be measured for metrology and process control, some type of modeling is often needed to determine parameter values of the structures from the measured output or signal. One particular challenge then to creating a suitable metrology method or tool is to find a way to model imperfect structures, which are imperfect in unknown ways. In fact, the imperfections are often what is of interest in metrology. Therefore, the need to account for such imperfections in metrology models can be critical to creating metrology methods and tools.

Some currently used methods for calculating the measured signal of any deviation from perfect correlation among the unit cells in a target semiconductor structure for x-ray diffraction include the use of Debye-Waller (DW) factors, which gives an empirical equation to describe how randomness decayed the scattering intensity. This method cannot associate DW factor value directly to complex geometry randomness value, e.g., CD sigma or tilt sigma. This method cannot predict the diffuse scattering for arbitrary situations and can only do certain simple situations.

Another currently used method involves the use of effective medium layers. However, such methods do not predict diffuse scattering. An additional method is the use of the Born or Distorted-Wave Born approximation (DWBA). This method suffers from the deficiencies of these approximations. In particular, they are only valid for a relatively small degree of aperiodicity/randomness. Yet another method uses a super-cell model which typically contains many unit cells, each with different randomized geometry. This method is however slow, e.g., roughly N to N^2 times slower than a single unit cell calculation. Here N is the number of holes used, and this method cannot give a smooth diffusive scattering distribution unless N becomes substantially large (e.g., about 100).

Previously used methods of calculating these measured signals for optical ellipsometry include the use of DW factors, which suffer from the same limitations as previously mentioned. Another previously used method uses effective medium interfacial layers. This method is extremely difficult for complex structures, and sensitivity is substantially limited.

The currently used methods have, therefore, a number of disadvantages. In addition, the currently used methods have a relatively small domain of accuracy. The currently used methods are not applicable to general structures with arbitrary randomness in the geometric or material parameters because the old methods (1) rely on a single simulation of the electromagnetic (E&M) equations or (2) are not applicable to arbitrary statistical distributions of randomness.

Accordingly, it would be advantageous to develop systems and methods for determining information for a specimen that do not have one or more of the disadvantages described above and are preferably applicable to general semiconductor device structures with arbitrary randomness and/or aperiodicity in the geometric and material parameters, including any statistical distribution of that randomness.

SUMMARY OF THE INVENTION

The following description of various embodiments is not to be construed in any way as limiting the subject matter of the appended claims.

One embodiment relates to a system configured for determining random variation in one or more structures formed on a specimen. The system includes an output acquisition subsystem configured for generating output for one or more structures formed a specimen. The system also includes a computer subsystem configured for determining one or more characteristics of the output generated for the one or more structures and simulating the one or more characteristics of the output with initial parameter values for the one or more structures. The computer subsystem is also configured for determining parameter values of the one or more structures formed on the specimen as the initial parameter values that resulted in the simulated one or more characteristics that best match the determined one or more characteristics. The determined parameter values are responsive to random variation in one or more parameters of the one or more structures on the specimen. The system may be further configured as described herein.

Another embodiment relates to a method for determining random variation in one or more structures on a specimen. The method includes the steps described above, which are performed by a computer subsystem coupled to an output acquisition subsystem. Each of the steps of the method may be performed as described further herein. The method may include any other step(s) of any other method(s) described herein. The method may be performed by any of the systems described herein.

An additional embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

A further embodiment relates to a system configured for determining random variation in one or more structures formed on a specimen. This system includes an output acquisition subsystem configured for generating output for one or more structures formed on a specimen. The system also includes one or more components executable on a computer subsystem coupled to the output acquisition subsystem. The one or more components include a machine learning (ML) model configured for determining random variation in one or more parameters of the one or more structures formed on the specimen based on the generated output. This system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 12 is a plot of NanoSheet LCDU 3Sigma measured from the simulated spectra, compared with reference values;

FIG. 13A is a schematic diagram illustrating a cross-sectional view of one example of a NanoSheet Fin SiGe Recess structure as designed where LCDU 3Sigma=0;

FIG. 13B is a schematic diagram illustrating a cross-sectional view of one example of a NanoSheet SiGe Recess with LCDU generated (SiGe Recess 3Sigma=1 nm) using a supercell whose pitch is 7× the designed one;

Figure 1:
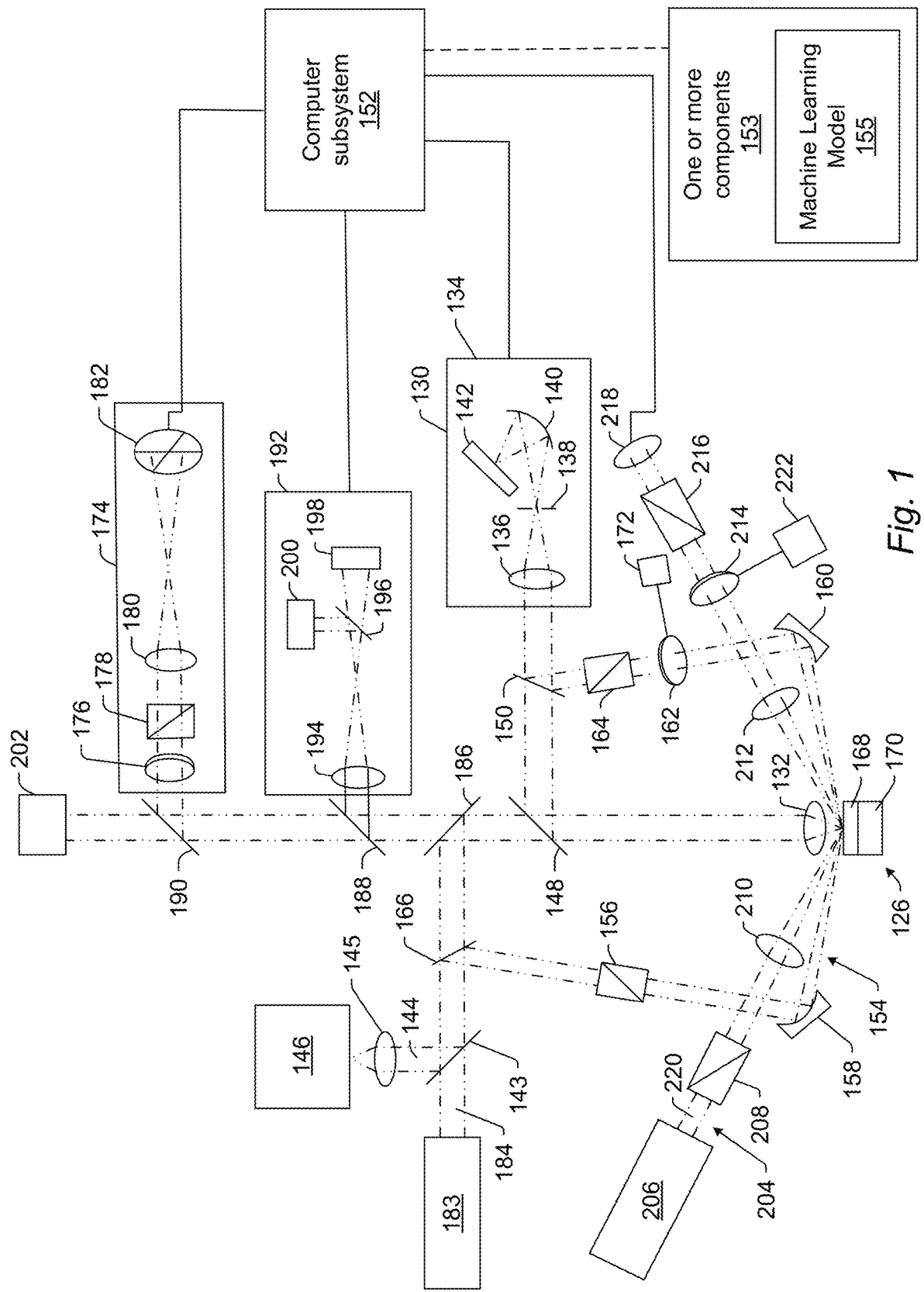
FIG. 1 is a schematic diagram illustrating a side view of an embodiment of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are systems and methods for determining random variation in one or more structures on a specimen. For example, the embodiments described herein provide optical and x-ray metrology methods for patterned semiconductor structures with random variation in one or more structures. The random variation may be random variation in any one or more parameters of the structure(s) including any dimension of the structures (where any dimension of the structure(s) is also referred to herein as "critical dimension (CD)") and other parameters such as period, side wall angle, roughness, etc. The "random variation" is referred to herein interchangeably as randomness, aperiodicity, roughness, local critical dimension uniformity (LCDU), locality, edge placement error (EPE), stochastic variability, and any combination thereof. In addition to other advantages described herein, the system and method embodiments allow for (1) randomness in any geometric or material parameters and (2) arbitrary statistical distribution of randomness for those parameters.

Semiconductor metrology is the process of determining geometric parameters of a semiconductor structure from measured signals. To perform semiconductor metrology, a measurement is performed followed by a software calculation that converts the measurement into metrological parameters (geometric parameters such as CD).

In extracting the geometric parameters, an inverse scattering problem may be solved. For example, a geometric model combined with electromagnetic (Maxwell) equation solvers may be used to compute the predicted signal as a function of the geometric parameters. The computed signal may be used to extract the geometric parameters from the measurement in two ways: (1) regression; and (2) machine learning (ML).

In computing a predicted signal, the measurement must be accurately modeled. The embodiments described herein enable the measurement to be modeled more accurately. The embodiments allow more accurate measurement predictions because they model the physical reality in which the geometric structures in the semiconductor device are not perfectly periodic. In other words, the embodiments described herein improve the simulation capability that is needed for semiconductor metrology to better accommodate physical reality in which semiconductor structures are not perfectly periodic. The deviation from perfect periodicity is also called randomness, aperiodicity, or locality herein. It produces notable features in the measured signal that the embodiments are designed to model specifically. These may include depolarization (optical metrology) and diffuse scattering (x-ray metrology).

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, printed circuit boards (PCBs), and other semiconductor specimens.

One embodiment of a system configured for determining random variation in one or more structures formed on a specimen is shown in FIG. 1. The system includes an output acquisition subsystem configured for generating output for one or more structures formed on specimen 126. The output acquisition subsystem includes and/or is coupled to computer subsystem 152.

In general, the output acquisition subsystems described herein include at least an energy source, a detector, and a scanning subsystem. The energy source is configured to generate energy that is directed to a specimen by the output acquisition subsystem. The detector is configured to detect energy from the specimen and to generate output responsive to the detected energy. The scanning subsystem is configured to change a position on the specimen to which the energy is directed and from which the energy is detected.

In one embodiment, the output acquisition subsystem is configured as a light-based output acquisition subsystem. FIG. 1 illustrates an embodiment of a system that includes various light-based output acquisition subsystems. The output acquisition subsystems shown in FIG. 1 are described in more detail in U.S. Pat. No. 6,515,746 to Opsal et al., which is incorporated by reference as if fully set forth herein. Some of the non-essential details of the system presented in this patent have been omitted from the description corresponding to FIG. 1 presented herein. However, it is to be understood that the system illustrated in FIG. 1 may be further configured as described in this patent. In addition, it will be obvious upon reading the description of several embodiments provided herein that the system illustrated in FIG. 1 has been altered to improve upon the system described in U.S. Pat. No. 6,515,746 to Opsal et al. The alterations include accounting for randomness, aperiodicity, roughness, and/or LCDU in the methods for determining parameter values from the output generated by the system.

One of the output acquisition subsystems is configured as a broadband reflective spectrometer. Broadband reflective spectrometer (BRS) 130 simultaneously probes specimen 126 with multiple wavelengths of light. BRS 130 uses lens 132 and includes a broadband spectrometer 134 which can be of any type commonly known and used in the art. Lens 132 may be a transmissive optical component formed of a material such as calcium fluoride ($CaF_2$). Such a lens may be a spherical, microscope objective lens with a high numerical aperture (on the order of 0.90 NA) to create a large spread of angles of incidence with respect to the specimen surface, and to create a spot size of about one micron in diameter. Alternatively, lens 132 may be a reflective optical component. Such a lens may have a lower numerical aperture (on the order of 0.4 NA) and may be capable of focusing light to a spot size of about 10-15 microns. Spectrometer 134 shown in FIG. 1 includes lens 136, aperture 138, dispersive element 140, and detector array 142. Lens 136 may be formed of $CaF_2$.

During operation, probe beam 144 from light source 146 is collimated by lens 145, directed by mirror 143 through mirror 166 to mirror 186, which directs the light through mirror 148 to lens 132, which is then focused onto specimen 126 by lens 132. The light source may include any of the light sources described above. Lens 145 may be formed of $CaF_2$.

Light reflected from the surface of the specimen passes through lens 132 and is directed by mirror 148 (through mirror 150) to spectrometer 134. Lens 136 focuses the probe beam through aperture 138, which defines a spot in the field of view on the specimen surface to analyze. Dispersive element 140, such as a diffraction grating, prism, or holographic plate, angularly disperses the beam as a function of wavelength to individual detector elements contained in detector array 142.

The different detector elements measure the optical intensities of different wavelengths of light contained in the probe beam, preferably simultaneously. Alternately, detector 142 can be a charge-coupled device ("CCD") camera or a photomultiplier with suitably dispersive or otherwise wavelength selective optics. It should be noted that a monochrometer could be used to measure the different wavelengths serially (one wavelength at a time) using a single detector element. Further, dispersive element 140 can also be configured to disperse the light as a function of wavelength in one direction, and as a function of the angle of incidence with respect to the specimen surface in an orthogonal direction, so that simultaneous measurements as a function of both wavelength and angle of incidence are possible. Computer subsystem 152 processes the intensity information measured by detector array 142.

Broadband spectroscopic ellipsometer (BSE) 154 is also configured to perform measurements of the specimen using light. BSE 154 includes polarizer 156, focusing mirror 158, collimating mirror 160, rotating compensator 162, and analyzer 164. In some embodiments, BSE 154 may be configured to perform measurements of the specimen using light provided by light source 146, light source 183, or another light source (not shown).

In operation, mirror 166 directs at least part of probe beam 144 to polarizer 156, which creates a known polarization state for the probe beam, preferably a linear polarization. Mirror 158 focuses the beam onto the specimen surface at an oblique angle, ideally on the order of 70 degrees to the normal of the specimen surface. Based upon well known ellipsometric principles, the reflected beam will generally have a mixed linear and circular polarization state after interacting with the specimen, based upon the composition and thickness of the specimen's film 168 and substrate 170.

The reflected beam is collimated by mirror 160, which directs the beam to rotating compensator 162. Compensator 162 introduces a relative phase delay 8 (phase retardation) between a pair of mutually orthogonal polarized optical beam components. Compensator 162 is rotated at an angular velocity c about an axis substantially parallel to the propagation direction of the beam, preferably by electric motor 172. Analyzer 164, preferably another linear polarizer, mixes the polarization states incident on it. By measuring the light transmitted by analyzer 164, the polarization state of the reflected probe beam can be determined.

Mirror 150 directs the beam to spectrometer 134, which simultaneously measures the intensities of the different wavelengths of light in the reflected probe beam that pass through the compensator/analyzer combination. Computer subsystem 152 receives the output of detector 142, and processes the intensity information measured by detector 142 as a function of wavelength and as a function of the azimuth (rotational) angle of compensator 162 about its axis of rotation, to solve the ellipsometric values y and A as described in U.S. Pat. No. 5,877,859 to Aspnes et al., which is incorporated by reference as if fully set forth herein.

A system that includes the broadband reflective spectrometer and broadband spectroscopic ellipsometer described above may also include additional output acquisition subsystem(s) configured to perform additional measurements of the specimen using light. For example, the system may include output acquisition subsystems configured as a beam profile ellipsometer, a beam profile reflectometer, another optical subsystem, or a combination thereof.

Beam profile ellipsometry (BPE) is discussed in U.S. Pat. No. 5,181,080 to Fanton et al., which is incorporated by reference as if fully set forth herein. BPE 174 includes laser 183 that generates probe beam 184. Laser 183 may be a solid state laser diode from Toshiba Corp. which emits a linearly polarized 3 mW beam at 673 nm. BPE 174 also includes quarter wave plate 176, polarizer 178, lens 180, and quad detector 182. In operation, linearly polarized probe beam 184 is focused on specimen 126 by lens 132. Light reflected from the specimen surface passes up through lens 132 and mirrors 148, 186, and 188, and is directed into BPE 174 by mirror 190.

The position of the rays within the reflected probe beam correspond to specific angles of incidence with respect to the specimen's surface. Quarter-wave plate 176 retards the phase of one of the polarization states of the beam by 90 degrees. Linear polarizer 178 causes the two polarization states of the beam to interfere with each other. For maximum signal, the axis of polarizer 178 should be oriented at an angle of 45 degrees with respect to the fast and slow axis of quarter-wave plate 176. Detector 182 is a quad-cell detector with four radially disposed quadrants that each intercept one quarter of the probe beam and generate a separate output signal proportional to the power of the portion of the probe beam striking that quadrant.

The output signals from each quadrant are sent to computer subsystem 152. By monitoring the change in the polarization state of the beam, ellipsometric information, such as y and A, can be determined. To determine this information, computer subsystem 152 takes the difference between the sums of the output signals of diametrically opposed quadrants, a value which varies linearly with film thickness for very thin films.

Beam profile reflectometry (BPR) is discussed in U.S. Pat. No. 4,999,014 to Gold et al., which is incorporated by reference as if fully set forth herein. BPR 192 includes laser 183, lens 194, beam splitter 196, and two linear detector arrays 198 and 200 to measure the reflectance of the sample. In operation, linearly polarized probe beam 184 is focused onto specimen 126 by lens 132, with various rays within the beam striking the specimen surface at a range of angles of incidence. Light reflected from the specimen surface passes up through lens 132 and mirrors 148 and 186, and is directed into BPR 192 by mirror 188. The position of the rays within the reflected probe beam correspond to specific angles of incidence with respect to the specimen's surface. Lens 194 spatially spreads the beam two-dimensionally. Beam splitter 196 separates the S and P components of the beam, and detector arrays 198 and 200 are oriented orthogonal to each other to isolate information about S and P polarized light. The higher angle of incidence rays will fall closer to the opposed ends of the arrays. The output from each element in the diode arrays will correspond to different angles of incidence. Detectors arrays 198 and 200 measure the intensity across the reflected probe beam as a function of the angle of incidence with respect to the specimen surface. Computer subsystem 152 receives the output of detector arrays 198 and 200, and derives the thickness and refractive index of thin film layer 168 based on these angular dependent intensity measurements by utilizing various types of modeling algorithms. Optimization routines which use iterative processes such as least square fitting routines are typically employed.

The system shown in FIG. 1 may also include additional components such as detector/camera 202. Detector/camera 202 is positioned above mirror 190, and can be used to view reflected beams off of specimen 126 for alignment and focus purposes.

In order to calibrate BPE 174, BPR 192, BRS 130, and BSE 154, the system may include wavelength stable calibration reference ellipsometer 204 used in conjunction with a reference sample (not shown). For calibration purposes, the reference sample ideally consists of a thin oxide layer having a thickness, d, formed on a silicon substrate. However, in general the sample can be any appropriate substrate of known composition, including a bare silicon wafer, and silicon wafer substrates having one or more thin films thereon. The thickness d of the layer need not be known or be consistent between periodic calibrations.

Ellipsometer 204 includes light source 206, polarizer 208, lenses 210 and 212, rotating compensator 214, analyzer 216, and detector 218. Compensator 214 is rotated at an angular velocity y about an axis substantially parallel to the propagation direction of beam 220, preferably by electric motor 222. It should be noted that the compensator can be located either between the specimen and the analyzer (as shown in FIG. 1) or between the specimen and polarizer 208. It should also be noted that polarizer 208, lenses 210 and 212, compensator 214, and polarizer 216 are all optimized in their construction for the specific wavelength of light produced by light source 206, which maximizes the accuracy of the ellipsometer.

Light source 206 produces a quasi-monochromatic probe beam 220 having a known stable wavelength and stable intensity. This can be done passively, where light source 206 generates a very stable output wavelength which does not vary over time (i.e., varies less than 1%). Examples of passively stable light sources are a helium-neon laser, or other gas discharge laser systems. Alternately, a non-passive system can be used where the light source includes a light generator (not shown) that produces light having a wavelength that is not precisely known or stable over time, and a monochrometer (not shown) that precisely measures the wavelength of light produced by the light generator. Examples of such light generators include laser diodes, or polychromatic light sources used in conjunction with a color filter such as a grating. In either case, the wavelength of beam 220, which is a known constant or measured by a monochrometer, is provided to computer subsystem 152 so that ellipsometer 204 can accurately calibrate the optical measurement devices in the system.

Operation of ellipsometer 204 during calibration is further described in U.S. Pat. No. 6,515,746. Briefly, beam 220 enters detector 218, which measures the intensity of the beam passing through the compensator/analyzer combination. Computer subsystem 152 processes the intensity information measured by detector 218 to determine the polarization state of the light after interacting with the analyzer, and therefore the ellipsometric parameters of the specimen. This information processing includes measuring beam intensity as a function of the azimuth (rotational) angle of the compensator about its axis of rotation. This measurement of intensity as a function of compensator rotational angle is effectively a measurement of the intensity of beam 220 as a function of time, since the compensator angular velocity is usually known and a constant.

By knowing the composition of the reference sample, and by knowing the exact wavelength of light generated by light source 206, the optical properties of the reference sample such as film thickness d, refractive index and extinction coefficients, etc., can be determined by ellipsometer 204. Once the thickness d of the film has been determined by ellipsometer 204, then the same sample is probed by the other optical measurement devices BPE 174, BPR 192, BRS 130, and BSE 154 which measure various optical parameters of the sample. Computer subsystem 152 then calibrates the processing variables used to analyze the results from these optical measurement devices so that they produce accurate results. In the above described calibration techniques, all system variables affecting phase and intensity are determined and compensated for using the phase offset and reflectance normalizing factor discussed in U.S. Pat. No. 6,515,746, thus rendering the optical measurements made by these calibrated optical measurement devices absolute.

The above described calibration techniques are based largely upon calibration using the derived thickness d of the thin film. However, calibration using ellipsometer 204 can be based upon any of the optical properties of the reference sample that are measurable or determinable by ellipsometer 204 and/or are otherwise known, whether the sample has a single film thereon, has multiple films thereon, or even has no film thereon (bare sample).

In some embodiments, the output acquisition subsystems may have at least one common optical component. For example, lens 132 is common to BPE 174, BPR 192, BRS 130, and BSE 154. In a similar manner, mirrors 143, 166, 186, and 148 are common to BPE 174, BPR 192, BRS 130, and BSE 154. Ellipsometer 204, as shown in FIG. 1, does not have any optical components that are common to the other output acquisition subsystems. Such separation from the other output acquisition subsystems may be appropriate since the ellipsometer is used to calibrate the other output acquisition subsystems.

Computer subsystem 152 may be coupled to the detectors of the output acquisition subsystem in any suitable manner (e.g., via one or more transmission media, which may include "wired" and/or "wireless" transmission media) such that the computer subsystem can receive the output generated by the detectors. Computer subsystem 152 may be configured to perform a number of functions with or without the output of the detectors including the steps and functions described further herein. As such, the steps described herein may be performed "on-tool," by a computer subsystem that is coupled to or part of an output acquisition subsystem. In addition, or alternatively, other computer system(s) (not shown) may perform one or more of the steps described herein. Therefore, one or more of the steps described herein may be performed "off-tool," by a computer system that is not directly coupled to an output acquisition subsystem. Computer subsystem 152 may be further configured as described herein.

Computer subsystem 152 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 152 may be coupled to other computer system(s) (not shown) by any suitable transmission media, which may include any suitable wired and/or wireless transmission media known in the art. Two or more of such computer subsystems may also be effectively coupled by a shared computer-readable storage medium (not shown).

The output acquisition subsystem may be configured to have multiple modes. In general, a "mode" is defined by the values of parameters of the output acquisition subsystem used to generate output for the specimen. Therefore, modes that are different may be different in the values for at least one of the output generation parameters of the output acquisition subsystem (other than position on the specimen at which the output is generated). For example, for a light-based output acquisition subsystem, different modes may use different wavelengths of light. The modes may be different in the wavelengths of light directed to the specimen as described further herein (e.g., by using different light sources, different spectral filters, etc. for different modes).

The multiple modes may also be different in illumination and/or collection/detection. Furthermore, the modes may be different from each other in more than one way described herein (e.g., different modes may have one or more different illumination parameters and one or more different detection parameters). The output acquisition subsystem may be configured to generate output for the specimen with the different modes in the same scan or different scans, e.g., depending on the capability of using multiple modes to generate output for the specimen at the same time.

One embodiment of a system configured for determining information for a specimen includes an output acquisition subsystem configured for generating output for one or more structures formed on a specimen. In one embodiment, the output acquisition subsystem is configured as a metrology subsystem. As described above, the output acquisition subsystem shown in FIG. 1 may be configured as a metrology subsystem. In this manner, the embodiments described herein may be configured as metrology tools. In the field of semiconductor metrology, a metrology tool may include an illumination subsystem which illuminates a target, a collection subsystem which captures relevant information provided by the illumination subsystem's interaction (or lack thereof) with a target, device or feature, and a computer subsystem which analyzes the information collected using one or more algorithms. Metrology tools can be used to measure structural and material characteristics (e.g., material composition, dimensional characteristics of structures and films such as film thickness and/or critical dimensions (CDs) of structures, overlay, etc.) associated with various semiconductor fabrication processes. These measurements are used to facilitate process control and/or yield efficiencies in the manufacture of semiconductor dies.

The metrology tool can include one or more hardware configurations which may be used in conjunction with certain embodiments described herein to, e.g., measure the various aforementioned semiconductor structural and material characteristics. Examples of such hardware configurations include, but are not limited to, the following.

1. Spectroscopic ellipsometer (SE)
2. SE with multiple angles of illumination
3. SE measuring Mueller matrix elements (e.g. using rotating compensator(s))
4. Single-wavelength ellipsometers
5. Beam profile ellipsometer (angle-resolved ellipsometer)
6. Beam profile reflectometer (angle-resolved reflectometer)
7. Broadband reflective spectrometer (spectroscopic reflectometer)
8. Single-wavelength reflectometer
9. Angle-resolved reflectometer
10. Imaging system
11. Scatterometer (e.g. speckle analyzer)

The hardware configurations can be separated into discrete operational systems. On the other hand, one or more hardware configurations can be combined into a single tool. One example of such a combination of multiple hardware configurations into a single tool is shown in FIG. 1, which may be further configured as described in U.S. Pat. No. 7,933,026 to Opsal et al., which is incorporated by reference as if fully set forth herein. The systems described herein may be further configured as described in this reference.

FIG. 1 shows, for example, a schematic of an exemplary metrology tool that comprises: a) a broadband SE (i.e., 154); b) a SE (i.e., 204) with rotating compensator (i.e., 214); c) a beam profile ellipsometer (i.e., 174); d) a beam profile reflectometer (i.e., 192); e) a broadband reflective spectrometer (i.e., 130); and f) a deep ultraviolet reflective spectrometer (i.e., 130). In addition, there are typically numerous optical elements in such systems, including certain lenses, collimators, mirrors, quarter-wave plates, polarizers, detectors, cameras, apertures, and/or light sources. The wavelengths for optical systems can vary from about 120 nm to 3 microns. For non-ellipsometer systems, signals collected can be polarization-resolved or unpolarized. FIG. 1 provides an illustration of multiple metrology heads integrated on the same tool. However, in many cases, multiple metrology tools are used for measurements on a single or multiple metrology targets, which is described, e.g. in U.S. Pat. No. 7,478,019 to Zangooie et al., which is incorporated by reference as if fully set forth herein. The embodiments described herein may be further configured as described in this reference.

The illumination subsystem of the certain hardware configurations includes one or more light sources. The light source may generate light having only one wavelength (i.e., monochromatic light), light having a number of discrete wavelengths (i.e., polychromatic light), light having multiple wavelengths (i.e., broadband light) and/or light that sweeps through wavelengths, either continuously or hopping between wavelengths (i.e., tunable sources or swept sources). Examples of suitable light sources include, but are not limited to, a white light source, an ultraviolet (UV) laser, an arc lamp or an electrode-less lamp, a laser sustained plasma (LSP) source such as those commercially available from Energetiq Technology, Inc., Woburn, Massachusetts, a supercontinuum source (such as a broadband laser source) such as those commercially available from NKT Photonics Inc., Morganville, New Jersey, or shorter-wavelength sources such as x-ray sources, extreme UV sources, or some combination thereof. The light source may also be configured to provide light having sufficient brightness, which in some cases may be a brightness greater than about 1 W/(nm cm$^2$ Sr). The metrology system may also include a fast feedback to the light source for stabilizing its power and wavelength. Output of the light source can be delivered via free-space propagation, or in some cases delivered via optical fiber or light guide of any type.

The metrology tool may be designed to make many different types of measurements related to semiconductor manufacturing. Certain embodiments described herein may be applicable to such measurements. For example, in certain embodiments, the tool may measure characteristics of one or more targets (more generally and interchangeably referred to herein as "one or more structures"), such as critical dimensions, overlay, sidewall angles (SWAs), film thicknesses, process-related parameters (e.g., focus and/or dose). The targets can include certain regions of interest that are designed to be periodic in nature such as, for example, gratings in a memory die. Targets can include multiple layers (or films) whose thicknesses can be measured by the metrology tool. Targets can include target designs placed (or already existing) on the specimen for use, e.g., with alignment and/or overlay registration operations. Certain targets can be located at various places on the specimen. For example, targets can be located within the scribe lines (e.g., between dies) and/or located in the die itself. In certain embodiments, multiple targets are measured (at the same time or at differing times) by the same or multiple metrology tools as described in U.S. Pat. No. 7,478,019 to Zangooie et al. The data from such measurements may be combined. Data from the metrology tool is used in the semiconductor manufacturing process for example to feedforward, feed-backward and/or feed-sideways corrections to the process (e.g. lithography, etch) and therefore, might yield a complete process control solution.

As described above, the output acquisition subsystem may be configured for generating output for the specimen with one or more wavelengths of light. In addition, the output acquisition subsystem may be configured for generating output for the specimen with other electromagnetic radiation such as x-rays. In such instances, some obvious modifications to the system described above may be made but such modifications are within the ordinary skill in the art. In addition, the output acquisition subsystem described above may be further configured as described in U.S. Pat. No. 7,929,667 to Zhuang et al., U.S. Pat. No. 9,885,962 to Veldman et al., U.S. Pat. No. 10,013,518 to Bakeman et al., U.S. Pat. No. 10,324,050 to Hench et al., and U.S. Pat. No. 10,352,695 to Gellineau et al. and U.S. Patent Application Publication Nos. 2018/0106735 to Dziura et al. and 2019/0017946 to Wack et al., all of which are incorporated by reference as if fully set forth herein. The embodiments described herein may be further configured as described in these publications.

The embodiments described herein have been created to calculate the effect of randomness, i.e., aperiodicity, in the semiconductor device structure upon the measured signal. As described further herein, some embodiments are configured for (1) ellipsometry signals at optical wavelengths (e.g., any one or more wavelengths, which may include any of the wavelength(s) described herein including extreme ultraviolet (EUV) wavelength(s), vacuum ultraviolet (VUV) wavelength(s), deep ultraviolet (DUV) wavelength(s), visible wavelength(s), etc.) and/or (2) diffraction signals at x-ray wavelengths (e.g., soft x-rays having a wavelength of about 0.12 nm to about 5 nm).

In one embodiment, the structure(s) are designed to be periodic but have an unknown periodicity as formed on the specimen. For example, the nominal (ideal) periodic structure is described by geometric parameters such as CD, height, SWA, etc., and by material parameters such as composition and density as described further above. In a perfectly periodic nominal structure, the geometric and material parameters are the same in every unit cell. In other words, the geometric parameters in different unit cells are perfectly correlated. In the true measured structure, the geometric and material parameters in different unit cells are not perfectly correlated, and the deviation from perfect correlation is herein called randomness or aperiodicity. In other words, the embodiments described herein calculate the effect upon the measured signal of any deviation from perfect correlation among the unit cells in the target semiconductor device structure.

In some embodiments, the output acquisition subsystem is a light-based subsystem. Such an output acquisition subsystem may be further configured as described herein and shown in FIG. 1. As can be seen from the above description, the embodiments described herein may be used with output acquisition subsystems having many different characteristics. In addition, the embodiments described herein can be used for optical metrology and x-ray metrology. Methods of simulation and methods in which the simulation is matched to the measurements are described below with respect to both types of metrology.

The system also includes a computer subsystem (e.g., computer subsystem 152) configured for determining one or more characteristics of the output generated for the one or more structures. In one embodiment, the output generated by the output acquisition subsystem is responsive to light from the specimen, and the characteristic(s) include depolarization in the light. For example, in the optical metrology application, real spectra measured for a specimen may be converted to depolarization (DoP) values. In an additional embodiment, the output is responsive to x-rays from the specimen, and the one or more characteristics include diffuse scattering and diffraction order intensities. For example, in the x-ray metrology application, the output generated for the one or more structures may be a CCD signal, and determining the one or more characteristics may include determining a diffuse part of the CCD signal. These steps may be performed as described further herein.

The computer subsystem is also configured for simulating the one or more characteristics of the output with initial parameter values (also referred to herein as "given input parameter values") for the one or more structures. For example, the LCDU distribution may be parameterized by CD mean, $\mu CD$, and variation, $\Delta CD$. In the optical metrology case, an initial guess for $\mu CD$, and $\Delta CD$ may be made, and simulated DoP values may be obtained as described further herein. In the x-ray metrology case, an initial guess for $\mu CD$ and $\Delta CD$ may be made, and simulated CCD images may be obtained as described further herein.

In both the optical and x-ray wavelengths, the computer subsystem may calculate a single measurement, simulate multiple profiles, with parameter values, e.g., generated according to an input probability distribution. In other words, the methods described herein may calculate the response of randomness structures by simulating multiple profiles with parameter values generated according to an input probability distribution and combining them into a single spectra. In one embodiment, a probability distribution that describes the random variation is a Gaussian distribution, dual-Gaussian distribution, uniform distribution, skewed Gaussian distribution, or Poisson distribution. In some embodiments, the inverse cumulative distribution function is interpolated. In an additional embodiment, the computer subsystem is configured for generating the initial parameter values by quasi-random number generation. The computer subsystem may also be configured for determining an arbitrary statistical distribution of aperiodic degrees of freedom including arbitrary characteristics, which may include one or more of correlations and non-Gaussian distributions, by sampling the arbitrary statistical distribution by a quadrature defined by quasirandom or pseudorandom numbers. In another embodiment, the computer subsystem is configured for generating the initial parameter values independently. In a further embodiment, the computer subsystem is configured for generating the initial parameter values with a predetermined correlation. For example, the different geometric parameters may be generated independently or coupled with a given correlation. In one such embodiment, a probability distribution that describes the random variation includes a correlation predetermined by a user a priori such that one value of the arbitrary single parameter (e.g., $\Delta CD$) for each geometric critical dimension parameter of the one or more parameters is sufficient for describing a correlated multi-parameter distribution. The input probability distribution and generating the input parameter values may otherwise be performed in any suitable manner known in the art.

In another embodiment, the input probability distribution is a random probability distribution, and the computer subsystem is configured for determining the random probability distribution by collecting electrical testing results from multiple devices within one die on an additional specimen and generating an electrical testing Gaussian distribution from the electrical testing results. In addition, the computer subsystem may be configured for determining a probability distribution that describes the random variation by collecting electrical testing results from multiple devices within one die on an additional specimen and generating an electrical testing Gaussian distribution from the electrical testing results. For example, electrical testing results generated for another specimen may be used to determine probable parameter values for the structures formed on that specimen, e.g., using some correlation between electrical testing results and physical parameters. If the other specimen is similar enough to the specimen and/or is processed in a similar manner as the specimen, those probable parameter values may be used to determine the input probability distribution for the embodiments described herein. The random probability distribution and determining the random probability distribution in this manner may be performed in both the optical and x-ray embodiments described herein.

The computer subsystem is further configured for identifying the simulated one or more characteristics that best match the determined one or more characteristics by comparing the simulated one or more characteristics to the determined one or more characteristics. For example, for optical metrology, measured and simulated DoP spectra values may be compared, and the simulated DoP spectra that best match the real spectra may be selected. In addition, the simulations may be repeated until a best match is found, meaning until a simulated DoP spectra that matches the real DoP spectra to within some predetermined criteria is found. In the case of x-ray metrology, measured and simulated CCD signals (full or diffuse) may be compared, and the simulated CCD signals that best match the real CCD signals may be selected. In addition, the CCD signal simulations may be repeated until a best match is found in the same manner described above. These steps may be performed as described further herein.

The computer subsystem is also configured for determining parameter values of the one or more structures formed on the specimen as the initial parameter values that resulted in the simulated one or more characteristics that best match the determined one or more characteristics. The determined parameter values are responsive to random variation in one or more parameters of the one or more structures on the specimen. In one embodiment, the random variation in the one or more parameters are parameterized by one number per each of the one or more parameters of the one or more structures, and the one number is an arbitrary single parameter (e.g., $\Delta CD$). For example, in the optical metrology use case, the $\mu CD$ and $\Delta CD$ values that generated the simulated DoP spectrum that best matches the real DoP spectrum may be reported as the parameters for the one or more structures. In the x-ray metrology use case, the $\mu CD$ and $\Delta CD$ values that generated the simulated CCD signal that best matches the real CCD signal may be reported as the parameters for the one or more structures. These steps may be performed as described further herein.

Figure 3:
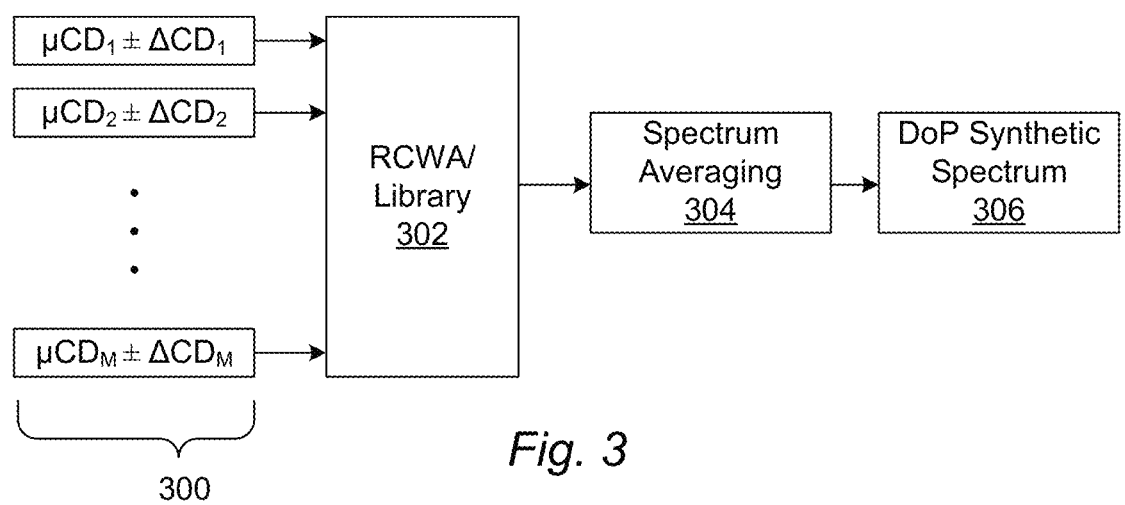
FIG. 3 is a flow chart illustrating an embodiment of an optical locality simulation method.

In some embodiments, the initial parameter values include CD vectors, and the simulating step includes generating a spectrum for each of the CD vectors, averaging the spectrum for each of the CD vectors, and determining a depolarization coefficient from the averaged spectrums. In another embodiment, the simulating step includes simulating the output generated for the one or more structures with the initial parameter values, the simulated output is a Mueller Matrix as a function of wavelength, and the simulating step also includes calculating an averaged Mueller Matrix function from the Mueller Matrix and calculating the depolarization in the light from the averaged Mueller Matrix function. FIG. 3 illustrates one such embodiment. In particular, FIG. 3 illustrates an optical locality simulation method. The method of simulation for optical locality may include generating a number M (M>30) of CD vectors 300 according to one of the distributions described herein. These CD vectors may be input to rigorous coupled wave analysis (RCWA)/Library 302 to generate a spectrum for each of the CD vectors, which is a Mueller Matrix (MM) as a function of wavelengths. The spectra generated by the RCWA/Library may be input to spectrum averaging step 304 in which the MM spectra are appropriately averaged, and the averaged MM spectrum is then used to determine depolarization coefficient, D, (DoP) synthetic spectrum 306, according to the formula:

$$D_N = D/M_{00} = 1 - \sqrt{\frac{\text{trace}(M_N \cdot M_N^T) - (1)^2}{3}}.$$

For example, after averaging N(50) MM signals from different CDs, D may be calculated as described above, where a normalized MM approximation→$M_{00}=1$.

Figure 4:
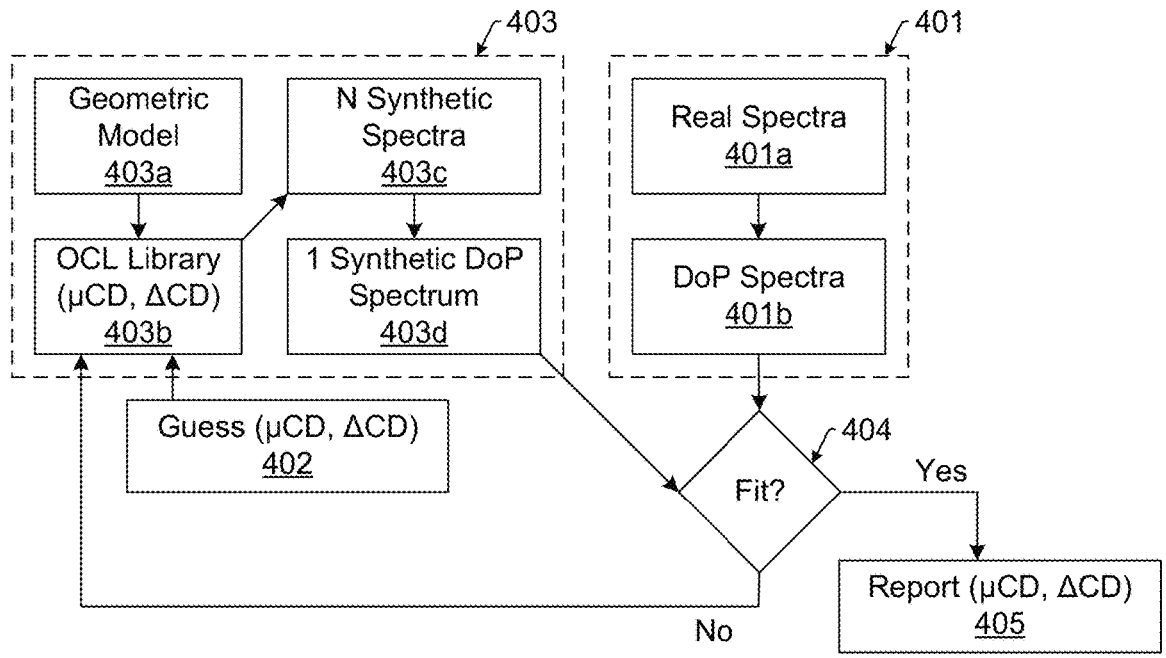
FIG. 4 is a flow chart illustrating an embodiment of a method for matching measured depolarization spectra.

In one embodiment, the determined parameter values include mean CD values and variation in CD values. For example, FIG. 4 illustrates one embodiment of a method for matching simulation to measurement for optical locality. In this method, measured and simulated DoP spectra are matched.

Determining the one or more characteristics of the output generated for the one or more structures may be performed as shown in step 401, in which real spectra 401a are converted to DoP values, DoP spectra 401b. In step 402, initial parameter values, $\mu CD$ and $\Delta CD$, may be guessed. In this step, an initial guess for CD mean, $\mu CD$, and variations, $\Delta CD$, may be made. Simulating the one or more characteristics of the output may then be performed in step 403 to simulate DoP values, which may be performed as described herein. For example, the initial parameter values guessed in step 402 and geometric model 403a may be input to OCL Library ($\mu CD$, $\Delta CD$) 403b to thereby generate N synthetic spectra 403c. The N synthetic spectra may then be used to determine 1 synthetic DoP spectrum 403d by, for example, averaging.

The DoP spectra 401b determined for the real spectra and the synthetic DoP spectrum 403d may then be input to step 404 in which it is determined if the synthetic spectrum fits the real spectra (i.e., if the synthetic spectrum matches the real spectra). If it is determined in step 404 that the synthetic spectrum does not match the real spectra, then step 403 may be repeated with another guess for $\mu CD$ and $\Delta CD$. If it is determined in step 404 that the synthetic spectrum does match the real spectra, then the μCD and ΔCD used to generate the synthetic spectrum may be reported in step 405.

In another embodiment, the simulating step includes calculating diffuse and specular scattering responsive to the random variation by averaging results of electromagnetic simulations over an ensemble of supercell profiles, determining a diffuse scattering from the averaged results, and determining a diffuse scattering detector signal by interpolation of the determined diffuse scattering. In this manner, the simulation of diffuse scattering may be performed by calculating total scattering and the diffraction order scattering (specular scattering) according to weighed averages, subtracting the total scattering from the diffraction order scattering, and interpolating the subtracted result. In one such embodiment, the simulating step also includes determining a diffraction detector signal from the averaged results and determining a full detector signal by combining the diffuse scattering detector signal and the diffraction detector signal. This method may be used for simulation for x-ray locality. The method of simulation for x-ray is similar to that for optical, with some below described differences. The signal is a CCD image, not DoP spectra.

In one embodiment, the computer subsystem is configured for identifying a first of the one or more characteristics of the output that is more responsive to at least one of the parameter values than a second of the one or more characteristics of the output, and determining the one or more characteristics, simulating the one or more characteristics, and determining the parameter values are performed with only the first of the one or more characteristics. For example, the CCD image is computed in two parts, diffuse and diffraction orders, and for fitting a measured signal, the full CCD signal or only the diffuse part may be kept. The computer subsystem may select the characteristics of the output that are used in the embodiments described herein as described further herein.

Figure 5:
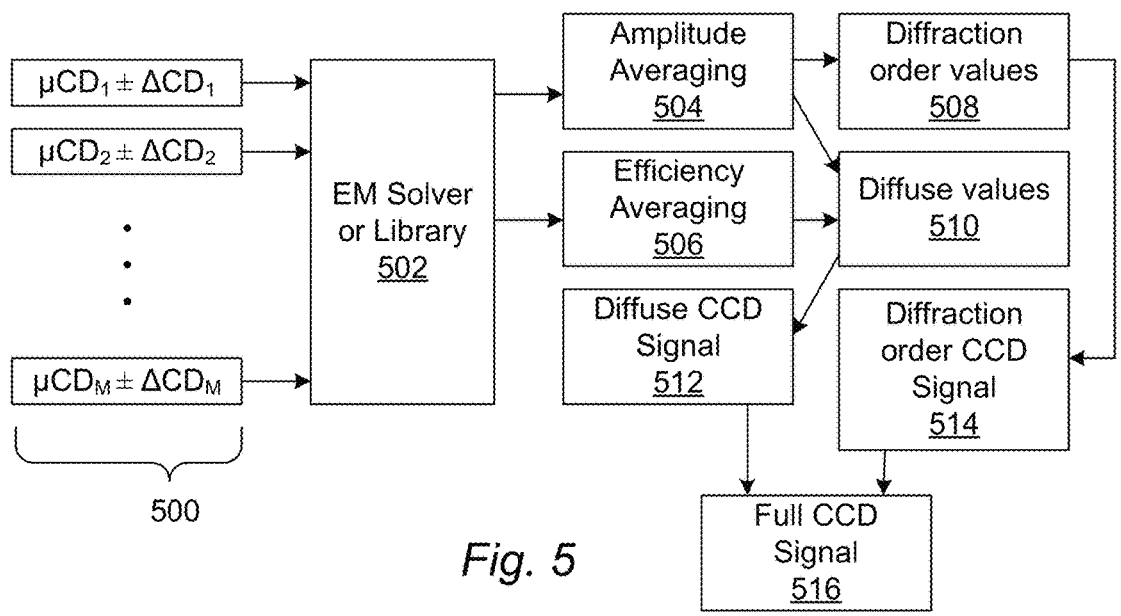
FIG. 5 is a flow chart illustrating an embodiment of an x-ray locality simulation method.

FIG. 5 shows one embodiment of the x-ray locality simulation method, producing the full CCD signal and/or the diffuse part only. The method of simulation for x-ray locality may include generating a number M (M>30) of CD vectors 500 according to a distribution. In one embodiment, the system includes one or more components (e.g., one or more components 153 shown in FIG. 1) executed by the computer subsystem, and the one or more components include an electromagnetic solver configured for performing the simulating step. In this manner, the simulation may be done via an electromagnetic solver. For example, CD vectors 500 shown in FIG. 5 may be input to EM solver or library 502.

The results of the simulations performed in step 502 may be input to amplitude averaging step 504 and efficiency averaging step 506. The amplitude averaging results may be used to determine diffraction order values 508, and the amplitude and efficiency averaging results may be used to determine diffuse values 510. The diffuse and specular scattering including CD nonuniformity may be calculated by averaging the simulations over an ensemble (100 or fewer) of relatively small supercell profiles. The diffuse values may be used to determine diffuse CCD signal 512, and the diffraction order values may be used to determine diffraction order CCD signal 514. The signal from specular scattering (diffraction orders) may be constructed in any suitable manner known in the art. The beam shape for the diffraction orders is unchanged. The diffuse CCD signal may be computed by interpolation. The diffuse and diffraction order CCD signals may then be used to determine full CCD signal 516. For example, the computer subsystem may combine the diffuse and specular CCD signals to create a full CCD signal.

Figure 6:
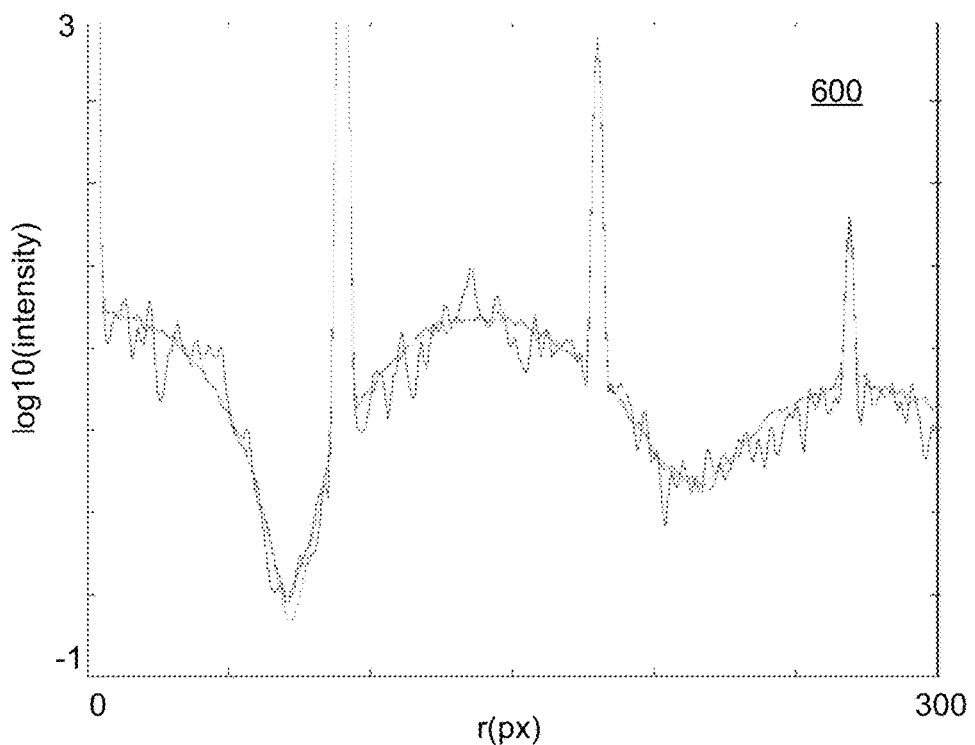
FIG. 6 is a plot showing one example of a match between charge coupled device (CCD) results produced with an embodiment of the x-ray locality method and a brute-force supercell method.

A relatively simple structure was simulated with the x-ray locality method described above. FIG. 6 illustrates an example of a match between results generated by the x-ray locality method described herein and a brute-force supercell method. Plot 600 shows log 10 (intensity) of the detector pixels as a function of detector pixel (Gaussian beam library), r(px). As can be seen from FIG. 6, the results generated by the x-ray locality method agree with the brute-force supercell calculation, but with much less computation. More specifically, the previously used super cell approach for x-ray converges relatively slowly to a smooth diffusive signal, and its computation time grows rapidly with the number of cells. In contrast, the embodiments described herein generate a relatively smooth diffusive signal while requiring only a few cells and have much faster computation time.

Figure 7:
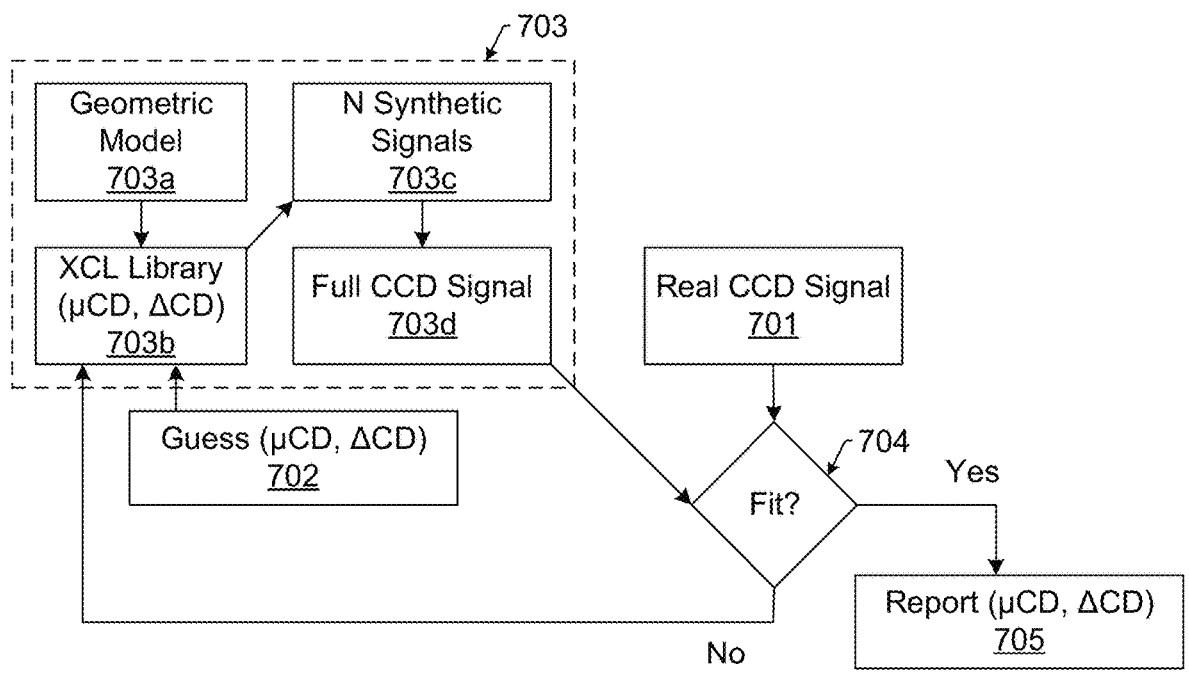
FIG. 7 is a flow chart illustrating an embodiment of a method for matching a full measured x-ray CCD signal.
Figure 8:
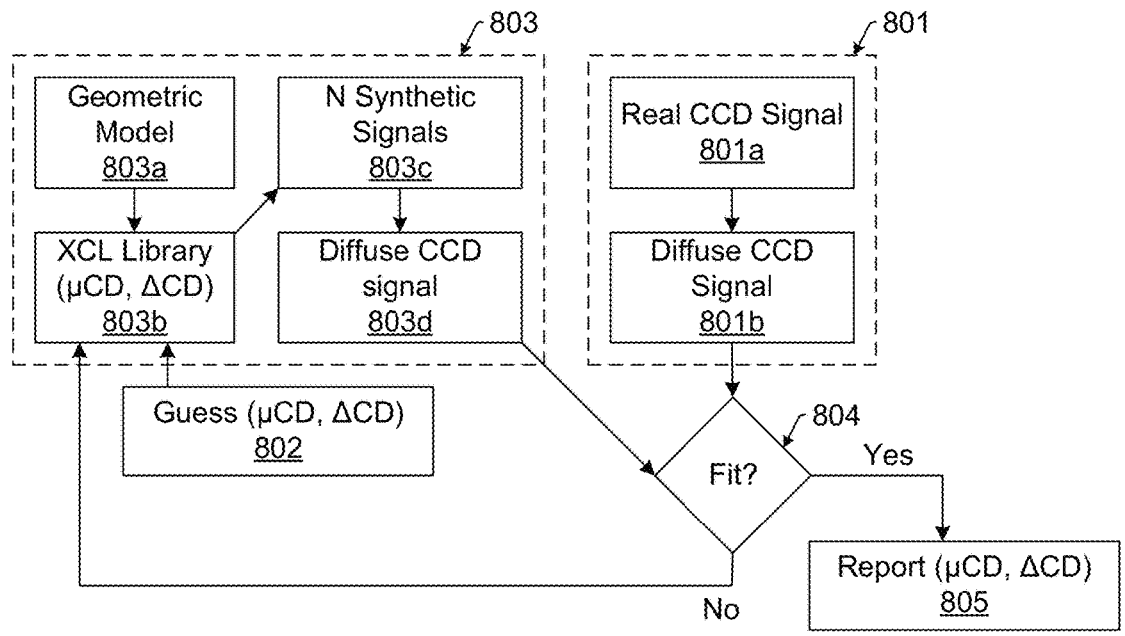
FIG. 8 is a flow chart illustrating one embodiment of a method for matching a processed CCD signal with only a diffuse part.

FIGS. 7 and 8 illustrate embodiments of methods for matching simulation to measurement (e.g., x-ray CCD measurement) for x-ray locality. FIG. 7 describes fitting of the entire CCD signal, i.e., the full, measured x-ray CCD signal, and FIG. 8 describes fitting a processed CCD signal with only the diffuse part.

In the full signal regression method shown in FIG. 7, measured and simulated full CCD signals are matched. Determining the one or more characteristics of the output generated for the one or more structures may be performed as shown in step 701, in which real CCD signal 701 are obtained. In this manner, determining the characteristic(s) may include simply generating or acquiring the real CCD signal and/or performing some processing of the real CCD signal, which may include any appropriate image processing known in the art.

In step 702, initial parameter values, μCD and ΔCD, may be guessed. In this step, an initial guess for μCD and ΔCD may be made. Simulating the one or more characteristics of the output may then be performed in step 703 to simulate full CCD signals, which may be performed as described herein. For example, the initial parameter values guessed in step 702 and geometric model 703a may be input to XCL Library (μCD, ΔCD) 703b to thereby generate N synthetic signals 703c. The N synthetic signals may then be used to determine full CCD signal 703d as described above.

The real CCD signal 701 and the synthetic CCD signal 703d may then be input to step 704 in which it is determined if the synthetic CCD signal fits (matches) the real CCD signal. If it is determined in step 704 that the synthetic CCD signal does not match the real CCD signal, then step 703 may be repeated with another guess for μCD and ΔCD. If it is determined in step 704 that the synthetic CCD signal does match the real CCD signal, then the μCD and ΔCD used to generate the synthetic CCD signal may be reported in step 705.

In the diffuse signal regression method shown in FIG. 8, full CCD signals are processed to generate CCD signals with the diffuse part only, which are then matched. Determining the one or more characteristics of the output generated for the one or more structures may be performed as shown in step 801, in which real CCD signal 801a is obtained and the diffuse part, i.e., diffuse CCD signal 801b, is extracted, which may be performed as described further herein.

In step 802, initial parameter values, μCD and ΔCD, may be guessed. In this step, an initial guess for μCD and ΔCD may be made. Simulating the one or more characteristics of the output may then be performed in step 803 to simulate diffuse CCD signals, which may be performed as described herein. For example, the initial parameter values guessed in step 802 and geometric model 803*a* may be input to XCL Library (μCD, ΔCD) 803*b* to thereby generate N synthetic signals 803*c*. The N synthetic signals may then be used to determine diffuse CCD signal 803*d* as described above.

The real diffuse CCD signal 801*b* and the synthetic diffuse CCD signal 803*d* may then be input to step 804 in which it is determined if the synthetic diffuse CCD signal fits (matches) the real diffuse CCD signal. If it is determined in step 804 that the synthetic diffuse CCD signal does not match the real diffuse CCD signal, then step 803 may be repeated with another guess for μCD and ΔCD. If it is determined in step 804 that the synthetic diffuse CCD signal does match the real diffuse CCD signal, then the μCD and ΔCD used to generate the synthetic diffuse CCD signal may be reported in step 805.

Figure 9:
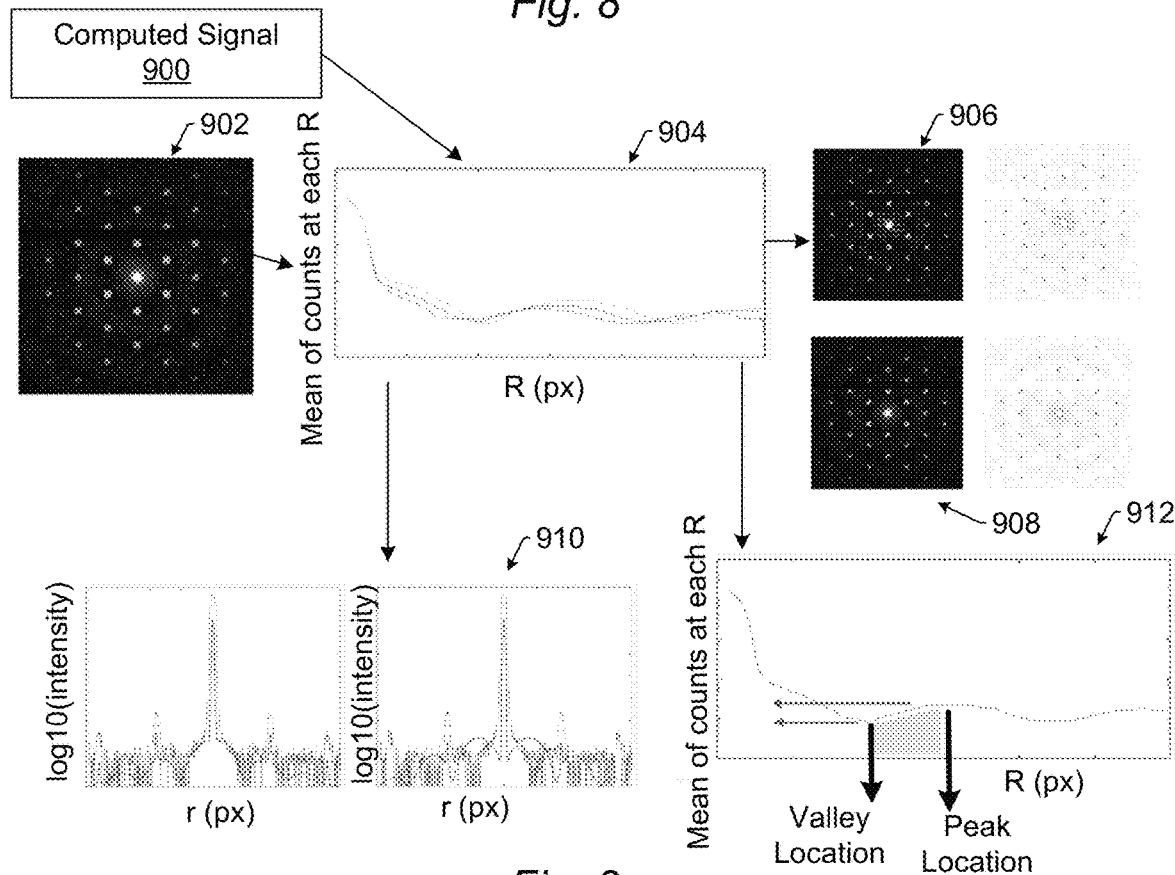
FIG. 9 is a flow chart illustrating one embodiment of using a diffuse signal for x-ray locality metrology.

In some embodiments, determining the characteristic(s) includes removing diffraction orders from the output to thereby extract the output responsive to only diffuse scattering in the output. This embodiment therefore provides an x-ray diffuse CCD signal extraction approach. For the method of fitting only the diffuse signal, the diffuse part of the measurement may be extracted in step 801 of FIG. 8 as illustrated below in FIG. 9. More specifically, FIG. 9 illustrates the use of diffuse signal for x-ray locality metrology that includes randomness diffuse signal extraction. This figure illustrates uses of the embodiments for x-ray metrology that incorporate separation of the signal into specular scattering (diffraction orders that appear as sharp peaks) and a diffuse background.

The computed signal is assembled explicitly as a sum of diffraction orders plus the diffuse part. As shown in FIG. 9, computed (simulated) signal 900 and measured signal 902 may be used to generate extracted diffuse signals 904. In this step, a measured signal may be processed to remove the diffraction order peaks. The diffuse part may be kept, and the diffraction orders discarded from the data. The plot of the extracted diffuse signals 904, mean of counts at each R vs. R (px), shows that the extracted diffuse signal has sensitivity to randomness across sites.

The extracted diffuse signals may be used as a beam shape. In addition, determining the one or more characteristics may include using a beam shape extracted from the diffuse scattering in order to match the full x-ray signal. For example, the diffuse signal, either that computed using the embodiments described herein or extracted from the measured data, may be used as a beam shape. This method or approximation allows the structure to be simulated as periodic, with the diffuse scattering being described by the beam shape to determine μCD and ΔCD values. FIG. 9 shows two beam shapes, 906 determined for a 16-hole fitting and 908 determined for 1-hole and extracted randomness.

The extracted diffuse signals may also be used to fit diffuse with regression or ML, results of which are shown in plots 910. In particular, the left plot is the measured vs. simulated CD roughness, and the right plot is the measured vs. simulated tilt roughness. The diffuse signal extracted from the measurement may be fit to the diffuse signal that is computed, using regression or ML, to determine μCD and ΔCD values. In addition, the extracted diffuse signals may be used to extract key characteristic parameters 912. In the key characteristic parameters extraction, the diffuse signal may be used in an empirical or ad-hoc manner to extract geometric parameters. In a similar manner, the output may include a full x-ray signal, and determining the one or more characteristics may include matching the full x-ray signal with a beam shape describing both the diffraction order intensities and the diffuse scattering. Certain geometric parameters may correlate with positions of peaks or valleys or integrals under the diffuse curve. Using such correlations, we may determine μCD and ΔCD values.

The embodiments described herein may be implemented, at least in part, with ML approaches. In one embodiment, the system includes one or more components 153 shown in FIG. 1 executed by computer subsystem 152, and the one or more components include a model-based ML model 155 configured for fitting the one or more characteristics of the output as a function of the initial parameter values. In this manner, the ML model may be configured as a model-based forward library trained on synthetic spectra. In a further embodiment, the system includes one or more components 153 executed by the computer subsystem, and the one or more components include a model-free ML model 155 configured for performing the simulating step. As such, the ML model may be configured as a model-free forward library that is trained on real spectra. In other words, the ML model may be model-free and trained using measured spectra only. "Model-free" means that the ML training data was generated without any physics simulation engines. Only real measurements are used for ML training. Model-free ML models are not necessarily generative models.

The one or more components may be executed by the computer subsystem in any suitable manner known in the art. At least part of executing the one or more components may include inputting one or more inputs, such as the initial parameter values, into the one or more components. The computer subsystem may be configured to input the initial parameter values into the one or more components in any suitable manner.

An important part of the embodiments described herein may be the use of ML to construct a fast forward model. For example, in one embodiment, the simulating includes simulating the output with a forward model configured for performing a regression technique. In this context, by "ML" we refer to the fitting of ab initio model values to flexible all-purpose functions, constructing a representation of y(x)—in which both y (the signal) and x (the geometric and measurement parameters, independent variables) are vectors, usually by least-squares fitting—that is faster than the ab initio Maxwell solver in computing y(x). This aspect of the embodiments may be implemented in steps 403*b*, 703*b*, and 803*b* of FIGS. 4, 7, and 8, respectively. In any case, the simulation may be done via a trained ML library.

In one embodiment, the simulating step is performed with a super-cell model having an arbitrary number of unit cells in x and y directions, and x and y are nominal periodic directions of the structures. For example, the computer subsystem may use a geometric model of the structure with material dispersion parameters and structural geometric parameters. Aperiodicity or randomness or deviation from local uniformity in these parameters is modeled by increasing the nominal designed pitch nx times in the x direction and ny times in the y direction. nx and ny are the minimum factors ensuring accurate sampling of the randomness distribution. nx and ny are integers equal to or greater than 1.

Figures 10A, 10B:
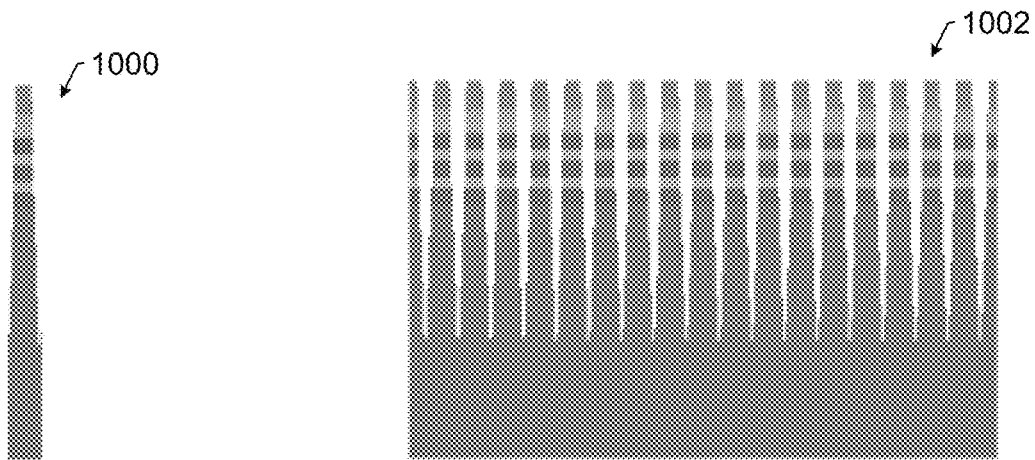
FIG. 10A is a schematic diagram illustrating a cross-sectional view of one example of a NanoSheet Fin etch grating as designed with local critical dimension uniformity (LCDU) 3Sigma=0.
FIG. 10B is a schematic diagram illustrating a cross-sectional view of one example of a NanoSheet Fin etch grating with LCDU generated (Fin CD 3Sigma=1.5 nm) and in which the pitch is 20× the designed one.

The following description is for a non-limiting example of a NanoSheet fin etch simulation. "NanoSheet" is a term used in the art to refer to a thin layer of silicon, used in the next generation of FinFET designs. In this example, the periodic grating model of FIG. 10A has been modified into a more realistic quasi-random supercell of FIG. 10B. For example, FIG. 10A shows NanoSheet fin etch grating 1000 as designed where LCDU 3Sigma=0. FIG. 10B shows NanoSheet fin etch grating 1002 with LCDU generated (fin CD 3Sgima=1.5 nm) and in which the pitch is 20× the designed one. The LCDU is induced into the model by increasing the unit cell pitch to 20× the designed one and removing the constraints from the adjacent CDs. In other words, the LCDU may be induced into the model by using a 20× supercell, i.e., with 20× pitch, having 20 repetitions of the unit cell grating. The fin middle CD (MCD) nominal value is 10 nm. For each of the 20 gratings, the CD can vary within a 2 nm range (+/−1 nm) from the nominal. The degree of uniformity is then the standard deviation of the 20 CD. A 3Sigma degree of interest is created in the model to account for the non-uniformity. The random nonuniformity occurs within 20× the designed pitch. Although the structure remains periodic overall, a CD Gaussian distribution is generated that can be simulated. Note that increasing the unit cell beyond 20× the designed pitch will not change the spectra for a given CD mean and 3Sigma values. This way, the Gaussian distribution of the LCDU is modeled with a RCWA model.

Figure 2:
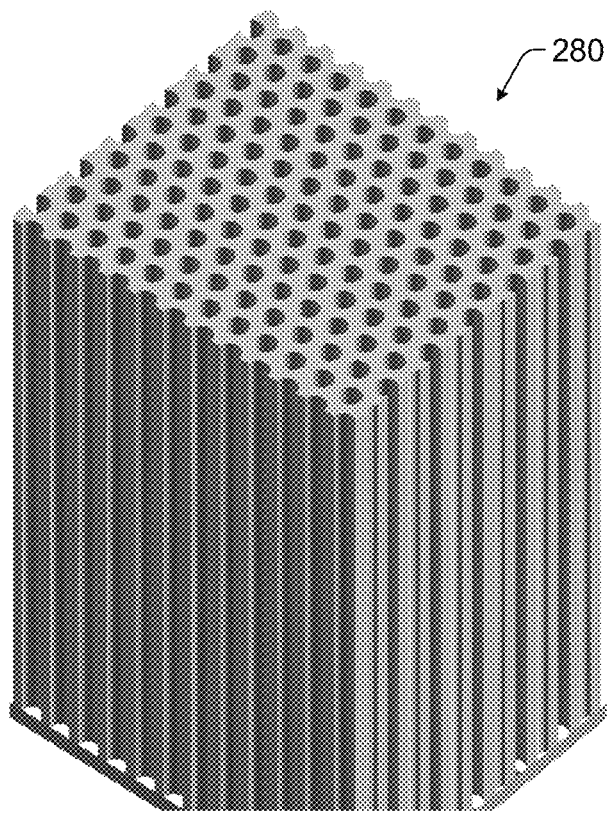
FIG. 2 is a schematic diagram illustrating a perspective view of one example of a super-cell, with Local Critical Dimension Uniformity (LCDU) 3Sigma=0.

In one embodiment, the one or more characteristics of the output are responsive to the random variation in the one or more parameters of the one or more structures as formed on the specimen according to an arbitrary statistical distribution of random (or "aperiodic") degrees of freedom parameterized by a user a priori and sampled by a quasirandom or pseudorandom distribution defining one supercell structure larger than the one or more structures or an ensemble thereof. Although the embodiment is described above with respect to 20 gratings, where 20 is the chosen supercell size or 20 is the number of repetitions of the unit cell in the supercell, it does not have to be exactly 20. This number is preferably large enough to describe the statistical distribution of randomness that causes the measured signal. No ensemble may be used in this calculation; the ensemble size is 1, so many (e.g., 20) repetitions of the unit cell should be used. The structure may be repeated to produce a supercell as illustrated in FIGS. 2 and 10B. If the supercell is too small, then the results will be inaccurate, and the ordering of the unit cells (described further below) will affect the result. If the supercell is too big, then the calculation will be too difficult. The methods of simulation for optical and x-ray locality described above employ an ensemble and thereby avoid using a relatively large supercell.

Figure 11:
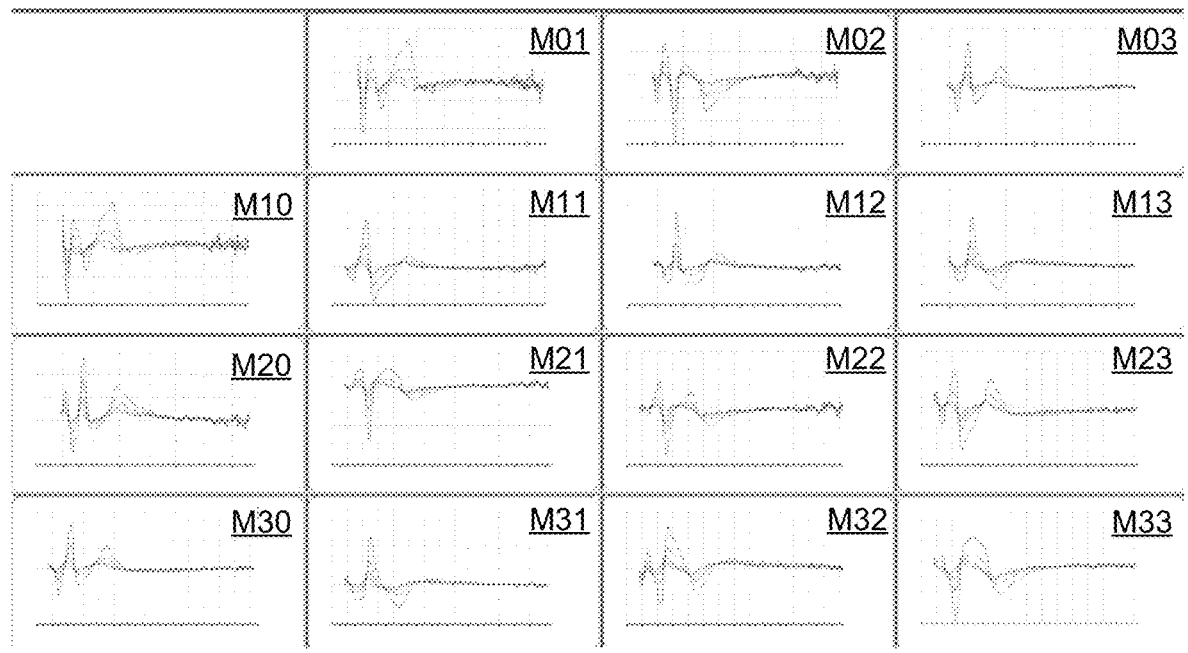
FIG. 11 includes plots showing results of simulation of spectral response with regard to 3Sigma variation.

FIG. 11 shows simulation of spectral response with regard to 3Sigma variation. All 4 spectra have an average CD (μCD) fixed at 10 nm with varying 3Sigma 0.5 nm, 1 nm, 1.5 nm, and 2 nm. Signal residuals reference is 3Sigma=0. This set of MM (M01 to M33) synthetic spectra are generated with the FIG. 10B model. 4 spectra have been selected with constant average (10 nm) and varying 3Sigma. Each spectrum residual is calculated by subtracting its corresponding spectrum from the 3Sigma=0 spectrum. The residuals are the signal response due to LCDU perturbation. The inventors have found that, as shown in FIG. 11, there is monotonic signal response as a function of 3Sigma for a fixed average CD. The most sensitive wavelength range is located between 190 nm and 400 nm. The average signal-to-noise ratio (SNR) across the wavelength range (190 nm to 850 nm) is 20× the noise level in commercially available metrology tools.

One important aspect of the LCDU modeling described above is the choice of the pertubated pitch as in FIG. 10B. It has been found that for each nanostructure, for a given (CD mean μCD, 3Sigma ΔCD), there is a minimum pitch beyond which the grating CD order (i.e., the ordering of the individual cells in the supercell, their association as neighbors, etc. as part of a sequence) does not matter as long as the CD mean and 3Sigma are unchanged. In other words, there is a minimum size of the supercell (number of unit cells, e.g., 20) for which the ordering of the unit cells within the supercell does not matter. In other words, the actual pitch to design pitch ratio (a_P/d_P) (the ratio is 20 in FIG. 7) should be chosen in a way that the spectra are no longer sensitive to the local CD order but only the CD mean (μCD) and 3Sigma (ΔCD). This way, the LCDU variation is modeled as mean and 3Sigma distribution at the micron scale. The min ratio can be determined experimentally, and it is one step among other steps in the embodiments described herein. The randomness is modeled in the perturbed unit cell at the pitch scale. Determining the a_P/d_P ratio is a key step toward modeling the LCDU using a RCWA method. The overall structure remains periodic, but the spectra are not sensitive to the grating order. This type of model can simulate the random LCDU on the physical wafer as two parameters, the CD mean and the 3Sigma.

In one such example, there may be 20 unit cells in a supercell, and they may be different due to the randomness. If their ordering 1 to 20 matters, then the calculation is not converged. More specifically, a nominal structure (one hole or one post) is repeated, e.g., 20×, to create a supercell (such as supercell 280 shown in FIG. 2) but each repetition is not exactly the same due to randomness, i.e., aperiodicity or locality. In the nominal structure without randomness, there is no need for a supercell because every unit cell is the same. To model randomness, most simply, we use a supercell ("brute-force method"). The supercell includes, e.g., 20, repetitions of the unit cell. But these structures are not exactly the same. There are differences among the 20 repetitions according to a pseudorandom or quasirandom sequence. The ordering of the indices of this sequence should not affect the results much. If the ordering of the unit cells within the supercell affects the results, that means that the calculation is not converged, and a bigger supercell (or an ensemble calculation) is required.

A 5000 set of synthetic spectra were generated with varying 3Sigma [0, 2.5 nm]. The 5000 spectra are used to train a neural network (NN) model. Then, the NN model is validated with a blind test set of spectra. FIG. 12 shows the blind test results of the LCDU represented by 3Sigma: the physics assist ML model extracts the NanoSheet CD 3Sigma from the spectra to an accepted accuracy level of 0.886 R2. In other words, FIG. 12 shows the NanoSheet local CDU 3Sigma measured from the simulated spectra/reference. The plot is the blind test results of the physics assist NN model. The linearity plot of FIG. 12 is consistent with the spectra split in FIG. 11 that predicts the MM component sensitivity to LCDU.

The above-described example is a simulated case. In another embodiment, the simulating step is performed with a ML model trained with synthetic and real spectra, and the real spectra are collected with a sampling selected so that a statistical distribution describing the random variation is determined per die on a training specimen. In this manner, the ML model may be configured as a hybrid forward library that is trained on both real and synthetic spectra. For example, in an optical randomness ML approach, a semiconductor metrology system and method for measuring LCDU within a measured spot may include collecting optical spectra from one spot of a die or multiple spots with a linescan. In addition, this approach may include collecting reference data such as transmission electron microscopy (TEM), atomic force microscopy (AFM), CD scanning electron microscopy (CDSEM), etc. From each die, collect relatively high sampling so that a Gaussian distribution is determined per die.

The following non-limiting example is based on real experimental data generated for a NanoSheet SiGe recess. FIG. 13A shows a NanoSheet fin SiGe recess structure 1300 as designed where LCDU 3Sigma=0. FIG. 13B shows NanoSheet SiGe recess structure 1302 with LCDU generated (SiGe recess 3Sigma=1 nm) and whose pitch is 10× the designed one. In this example, the real case is used to validate the method embodiments described herein. Metrology tool spectra were collected from a gate all around (GAA) SiGe recess set of wafers. (NanoSheet is one specific design of GAA transistors. Other designs include nanowire.) 9 dies were later measured by TEM. In each die, the TEM was sampled over 20 times in a way a Gaussian distribution is determined and 3Sigma reference is obtained. The reference LCDU is then used as a reference for the physics assist ML model developed using the approach described above.

The repeated grating model of FIG. 13B has been modified into a more realistic quasi-repeated grating. The LCDU is induced into the model by increasing the unit cell pitch to 10× the designed one and removing the constrain from the adjacent CDs. The SiGe recess nominal value is 5 nm. For each of the 10 gratings, the SiGe recess can vary within a 2 nm range (+/−1 nm) from the nominal. The degree of uniformity is then the standard deviation of the 10 CD. A 3Sigma degree of interest is created in the model to account for the non-uniformity. The random non-uniformity occurs within 10× the designed pitch. This way, the Gaussian distribution is modeled with an RCWA model.

Figure 14:
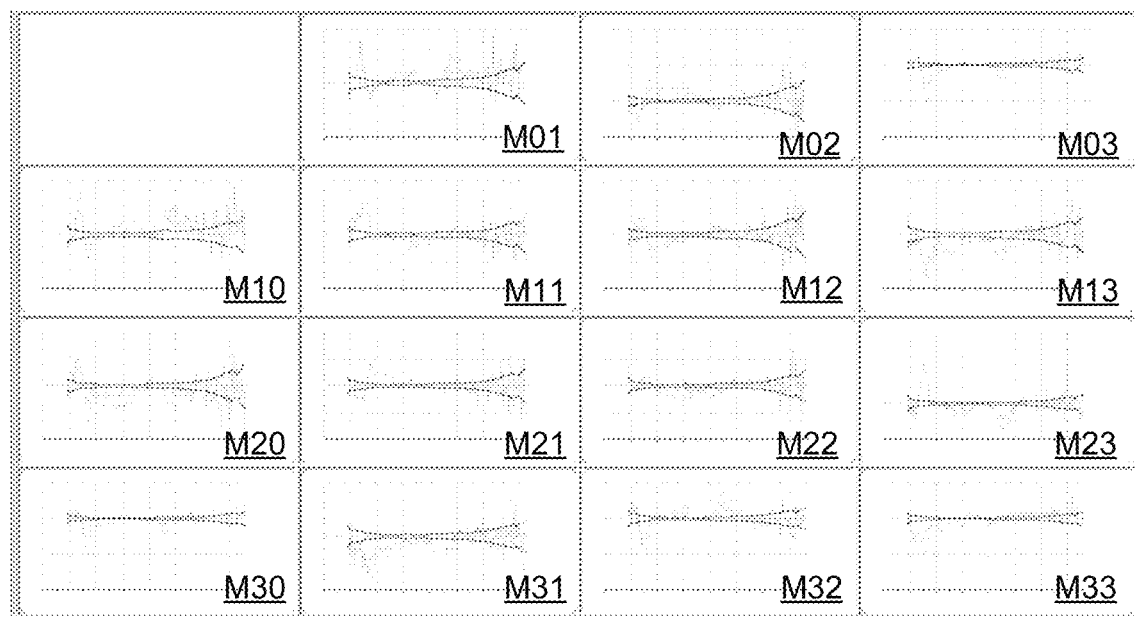
FIG. 14 includes plots showing results of simulation of spectral response with regard to 3Sigma variation.

The MM sensitivity to SiGe recess LCDU is tested using the simulated results. FIG. 14 plots the spectra residuals (one of the lines) of two spectra with LCDU (3Sigma ΔCD) of 2.6 nm and 3.7 nm with regards to 3Sigma=0. In other words, FIG. 14 shows the simulation of spectral response with regard to 3Sigma variation. The 2 spectra have an average SiGe recess fixed at 5 nm with varying 3Sigma 2.6 nm and 3.7 nm. The signal residuals reference is 3Sigma=0. The (other line) spectrum is the system noise level. From FIG. 14, it is clear that the residuals are above the noise, and the spectra variation is monotonic versus SiGe recess LCDU. The 3 spectra are generated while SiGe recess average is kept constant at 5 nm.

Figure 15:
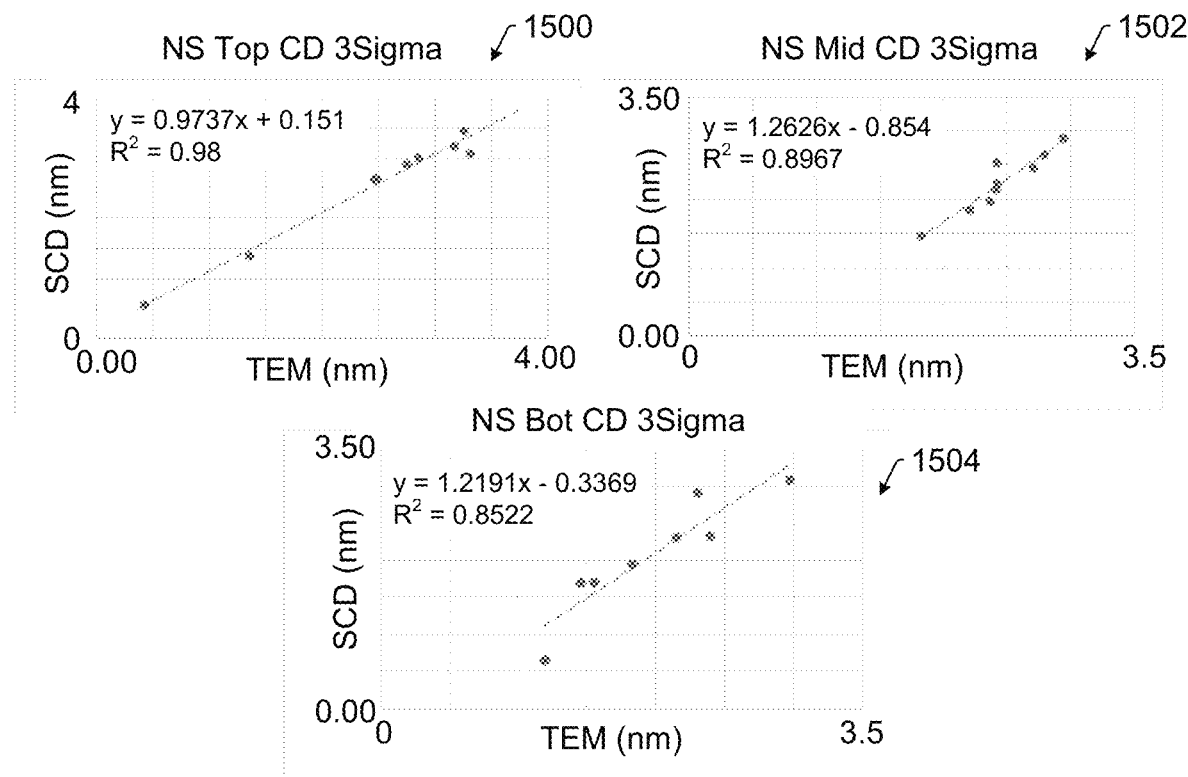
FIG. 15 includes plots showing gate all around (GAA) SiGe Recess LCDU 3Sigma results from the ML model, compared with reference values from transmission electron microscope measurements.

The synthetic spectra generated using the model shown in FIG. 13B are then fed into the ML model for a supervised training set. Once the cost function of the ML model is minimized, the model is validated with real spectra and data are plotted against the real TEM 3Sigma. FIG. 15 shows the blind test results of the model outcome versus the TEM 3Sigma. In other words, FIG. 15 shows the GAA SiGe recess LCDU data correlation to TEM 3Sigma. Each plot refers to a sheet specific measurement. More specifically, plot 1500 shows the NanoSheet (NS) top CD 3Sigma, plot 1502 shows the NS mid CD 3Sigma, and plot 1504 shows the NS bottom CD 3Sigma. The data is extracted from real measured wafers (not simulated).

Figure 16:
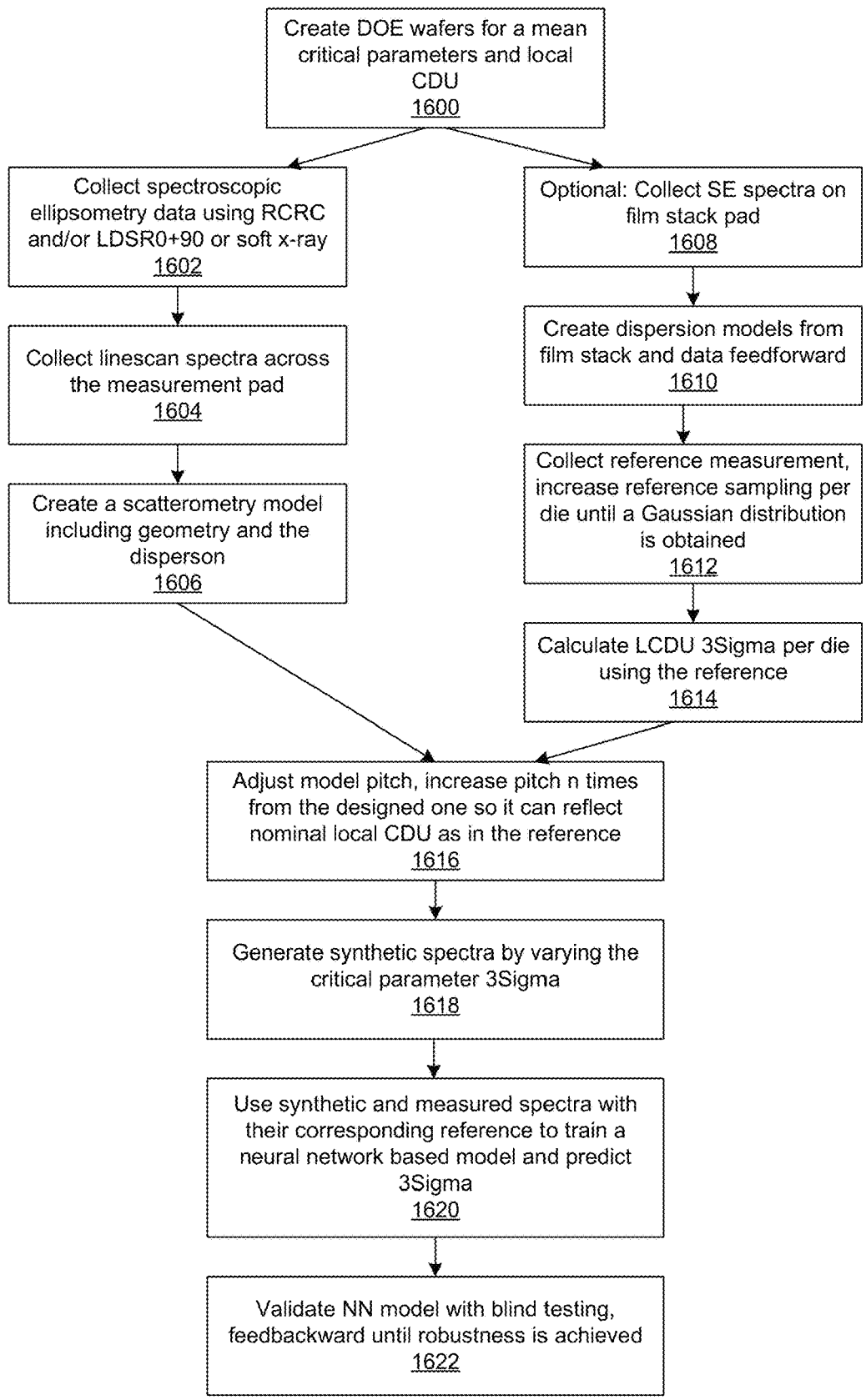
FIG. 16 is a flow chart illustrating one embodiment of a method for measuring and computing LCDU in devices to control a semiconductor process.

FIG. 16 shows one embodiment of a method for measuring and computing LCDU in devices to control a semiconductor process. As shown in step 1600, the method may include creating design of experiment (DOE) wafers for a mean critical parameters and LCDU. As shown in step 1602, the method may include collecting spectroscopic ellipsometry data using RCRC, i.e., a dual rotating compensator, and/or LDSR0+90, i.e., a laser-driven spectroscopic reflectometer used to take two different measurements with light incident from two different directions, or soft x-ray. The method may also include collecting linescan spectra across the measurement pad, as shown in step 1604.

The method may further include creating a scatterometry model including geometry and the dispersion, as shown in step 1606. In another embodiment, the computer subsystem is configured for generating a scatterometry model with material dispersion and structure geometry and generating local uniformity in the scatterometry model by increasing a designed pitch to n times, n is determined when a Gaussian distribution is generated with the die and n is the minimum pitch ensuring randomness, and the computer subsystem is configured for generating the synthetic spectra with the generated scatterometry model. For example, the computer subsystem may develop a scatterometry model with the material dispersion and the structure geometry.

The computer subsystem may also generate local uniformity in the model by increasing the designed pitch to n times. In one embodiment, a number of the synthetic spectra generated is automated to reach a minimum required accuracy and robustness of the LCDU. For example, in some embodiments, values of the arbitrary number of the unit cells in the x and y directions and a size of the ensemble are automated to reach a predetermined accuracy, a predetermined speed, a predetermined robustness, or a combination thereof of the results of the simulating. The computer subsystem may determine n automatically through calculation. n is determined when two conditions are reached (1) a Gaussian distribution is generated within the die and (2) n is the minimum pitch that ensures randomness. The computer subsystem may then generate synthetic spectra with the perturbed model generated above. The computer subsystem may also combine synthetic and real measured spectra to train a NN model. LCDU (3Sigma) may be extracted by relating the properties extracted from each spectrum using the NN model trained with real and synthetic spectra. The LCDU can be determined by relating any subset of the spectra measured as described herein using ML techniques such as NNs and structural risk minimization (SRM) techniques.

As shown in optional step 1608, the method may include collecting spectroscopic ellipsometer (SE) spectra on a film stack pad. In step 1610, the method may include creating dispersion models from the film stack and data feedforward. The method may further include collecting reference measurements (e.g., TEM, CDSEM, AFM, etc.), and increasing reference sampling per die until a Gaussian distribution is obtained, as shown in step 1612. In addition, the method may include calculating LCDU 3Sigma per die using the reference, as shown in step 1614.

The results of step 1606 and optionally step 1614 may be input to step 1616 in which the model pitch is adjusted, increasing the pitch n times from the designed one so that it can reflect nominal LCDU as in the reference. The method may include generating synthetic spectra by varying the critical parameter 3Sigma, as shown in step 1618. In addition, the method may include using synthetic and measured spectra with their corresponding reference to train a NN based model and predict 3Sigma, as shown in step 1620. The method may further include validating the NN model with blind testing and feeding backward until robustness is achieved, as shown in step 1602.

In some embodiments, the system is configured for metrology of the specimen, and the determined parameter values include central values and randomness coefficients of the one or more structures formed on the specimen. For example, the simulations described herein may be performed in the process of metrology, doing regression to obtain central values and randomness coefficients (e.g., standard deviation) of the measured structure. Such simulations and regression may be performed in both the optical and x-ray embodiments described herein.

In one embodiment, the super-cell model or the ensemble is designed to describe long-range correlations in the random variation in the one or more parameters of the one or more structures formed on the specimen. The simulating step may be performed in this manner in both the optical and x-ray configurations described herein. The term "long-range correlations" as used herein is generally defined as correlations among distinct random variations of the structure (or sample) that are separated by more than half the pitch in any direction.

In a further embodiment, the output is responsive to light from the specimen, the one or more characteristics include depolarization in the light, the simulating step includes simulating the output generated for the one or more structures with the initial parameter values, the simulated output is a Mueller Matrix as a function of wavelength, and the simulating step also includes simulating the depolarization in the light from a weighted average of elements in the Mueller Matrix separately simulated for two or more of the initial parameter values. For example, in the case of optical randomness, aperiodicity, and/or locality, the simulation and measurement may be performed at optical wavelengths, and the signal that is measured and simulated is a MM as a function of wavelength. As described above, the DoP is a function of the MM. The DoP may be calculated from a weighted average of the MM elements simulated from each random profile.

In one such embodiment, the simulating step is performed by regression with a cost function based on a weighted average of depolarization cost and Mueller Matrix cost. In other words, the cost function for regression may be a weighted average of DoP cost and MM cost. In an additional embodiment, the simulating step is performed by regression with a cost function based on only depolarization cost. In other words, the cost function for regression may be a function of DoP only (DoP) cost.

In another embodiment, the output is responsive to x-rays from the specimen, and the simulating step is performed with a super-cell model. In this manner, the x-ray randomness embodiments may use a super-cell approach. For example, a super-cell model such as super-cell model 280 shown in FIG. 2 (e.g., about 20 holes or more for a converged results) may be used to fit a measured x-ray diffraction image.

In one such embodiment, during the simulating step, the initial parameter values for each of the one or more structures are independently floated parameter values. For example, during regression, the parameters of each hole may be independently floated parameters.

In another such embodiment, during the simulating step, the initial parameter values for each of the one or more structures are determined from a mean that is floated and functions of the mean and fixed offsets sampled from a random distribution. For example, only the mean may be floated, and the parameters of the holes may be functions of the mean and fixed offsets sampled from a random distribution.

In the case of x-ray randomness, aperiodicity, and/or locality, the simulation and measurement are performed at x-ray wavelengths, and the signal that is measured and simulated is a CCD detector image. In a further such embodiment, the super-cell model is based on a super-cell that includes fewer than 10 of the one or more structures in x and y directions. For example, a relatively small super-cell may be used (e.g., 2 to 5 holes in the x and y directions).

In some embodiments, the simulating is performed with an ensemble of independent instances of the super-cell model, and the simulating includes averaging results of the simulating for the ensemble according to a weighted average formula. For example, in another embodiment, the simulating step includes simulating the output generated for the one or more structures with the initial parameter values and determining total scattering of diffraction order k-vectors of the super-cell from a weighted average of the simulated output. In other words, the total scattering at the supercell diffraction order k-vectors may be obtained from a weighted average of the calculations.

In an additional embodiment, the simulating includes simulating the output generated for the one or more structures with the initial parameter values and determining diffuse scattering of diffraction order k-vectors of the super-cell from a weighted average of the simulated output. In other words, the diffuse scattering at the supercell diffraction order k-vectors is obtained from a weighted average of the calculations.

In one embodiment, the simulating includes simulating the output generated for the one or more structures with the initial parameter values, determining total scattering of diffraction order k-vectors of the super-cell from a weighted average of the simulated output, and determining diffuse scattering of diffraction orders k-vectors of the super-cell by interpolating the total scattering. For example, the diffuse scattering away from the supercell diffraction order k-vectors may be obtained by interpolating the result of the weighted average of the calculations performed to determine the total scattering at the supercell diffraction order k-vectors.

In some embodiments, the simulating includes simulating multiple random profiles for scattering efficiency using a super-cell model, averaging the scattering efficiency, applying interpolation to the averaged scattering efficiency to generate a diffusive scattering distribution, and applying a model to fit measured random measurements. For example, the embodiments of the solver steps described herein may use a relatively small super-cell model. The solver steps may include simulating multiple random profiles for scattering efficiency and using the average scattering efficiency. The solver steps may also include applying interpolation to get a relatively smooth diffusive scattering distribution. In addition, the solver steps may include applying the system model to fit measured random measurements.

In some embodiments, the computer subsystem is configured for determining additional parameter values of the one or more structures from additional output generated by the output acquisition subsystem for the one or more structures, the additional parameter values include values of one or more geometric parameters of the one or more structures that are not responsive to the random variation in the one or more structures, and the output acquisition subsystem includes a mask blocking one or more regions of a detector between diffraction orders in x-rays from the specimen during generation of the additional output. For example, in the x-ray randomness raw signal extraction approach, a relatively small slit may be used in the x-ray tool to have a relatively wide gap between diffraction orders on the tool, and the computer subsystem may extract diffusive scattering signal from measurements and report key characteristic parameters from the diffuse signals. In one such embodiment, the diffusive signals are analyzed via regression with a 1D geometric or EM solver. The diffusive signals may also be analyzed via model-based or model-free ML. In addition, the diffusive signals may be fed into regression as diffusive background. When the main concern is finding geometric parameters and not finding the amount of randomness, the regions of the detector between diffraction orders may be masked out to reduce the effect of randomness on regression. For example, aperture 138 shown in FIG. 1 may be replaced with or include a mask configured as described above.

Another embodiment relates to a different system configured for determining random variation in one or more structures formed on a specimen. This system includes an output acquisition subsystem, which may be configured according to any of the embodiments described further herein. This system also includes one or more components (153 shown in FIG. 1) executable on a computer subsystem (152 shown in FIG. 1) coupled to the output acquisition subsystem. The one or more components includes a ML model (e.g., ML model 155 shown in FIG. 1) configured for determining random variation in one or more parameters of the one or more structures formed on the specimen based on the generated output.

This ML model may be differently configured and/or trained from the ML models described further above. For instance, the ML models described further above are configured for simulating output of an output acquisition subsystem that would be generated for one or more structures having one or more parameter values input to the ML models. In one specific example, the ML model may simulate spectra from input CD parameter values. In contrast, the ML model of this embodiment may be configured to predict structure parameter values directly from the output of the output acquisition subsystem.

The different ML models will be trained with different training data. For instance, in the first case, the training input may include ground truth parameter values for one or more training specimens, and the training output may include measured spectra for the one or more training specimens. In contrast, in the second case, the training input may include measured spectra for one or more training specimens, and the training output may include ground truth parameter values for the one or more training specimens. Therefore, in essence, the training inputs and outputs may be flipped between the different ML models described herein, but in both cases, the training inputs and outputs may be generated in the same way and as described further herein.

The ML model configured to predict structure parameter values from measured output (e.g., metrology tool signals or images) may be further configured as described herein. For example, in one embodiment, the ML model is a model-based ML model. In this embodiment, the ML model is configured as a model-based inverse library trained on synthetic spectra. In a different embodiment, the ML model is a model-free ML model. In this manner, the component(s) may include a model-free ML model configured for performing the simulating. In this embodiment, the ML model is configured as a model-free inverse library trained on real spectra. The training may also be performed as described further herein using any other training data described further herein. For example, in one embodiment, the ML model is trained with synthetic and real spectra, and the real spectra are collected with a sampling selected so that a statistical distribution describing the random variation is determined per die on a training specimen. In this manner, the ML model may be configured as a hybrid inverse library that is trained on both real and synthetic spectra.

The computer subsystem and the ML model may also be configured as described further herein. For example, in one embodiment, the computer subsystem is configured for determining a probability distribution that describes the random variation by collecting electrical testing results from multiple devices within one die on an additional specimen and generating an electrical testing Gaussian distribution from the electrical testing results. In another embodiment, the output is responsive to x-rays from the specimen, the ML model is configured for determining one or more characteristics of the output generated for the one or more structures as a function of structure parameters, or configured for determining one or more structure parameters as a function of one or more characteristics of the output, and the one or more characteristics of the output include diffuse scattering and diffraction order intensities. These embodiments may be further configured as described herein.

In one such embodiment, determining the one or more characteristics includes removing diffraction orders from the output to thereby extract the output responsive to only the diffuse scattering in the output. In another embodiment, the ML model is configured for determining additional parameter values of the one or more structures from additional output generated by the output acquisition subsystem for the one or more structures, the additional parameter values include values of one or more geometric parameters of the one or more structures that are not responsive to the random variation in the one or more structures, and the output acquisition subsystem includes a mask blocking one or more regions of a detector between diffraction orders in the x-rays from the specimen during generation of the additional output. In a further embodiment, the output generated by the output acquisition subsystem is responsive to light from the specimen, the ML model is configured for determining one or more characteristics of the output generated for the one or more structures as a function of structure parameters, or configured for determining one or more structure parameters as a function of one or more characteristics of the output, and the one or more characteristics include depolarization in the light. These embodiments may be further configured as described herein.

The computer subsystem may also be configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. In addition, the results may include any information for the specimen determined as described herein.

That information may be used by the computer subsystem or another system or method for performing additional functions for the specimen. Such functions include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that any determined parameter values that are outside of an acceptable range of values are corrected on other specimens on which the revised process is performed, are corrected on the specimen in another process performed on the specimen, are compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the output acquisition subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for determining random variation in one or more structures on a specimen. The method includes determining one or more characteristics of output generated by an output acquisition subsystem for one or more structures formed on a specimen. The method also includes simulating the one or more characteristics of the output with initial parameter values for the one or more structures. In addition, the method includes determining parameter values of the one or more structures formed on the specimen as the initial parameter values that resulted in the simulated one or more characteristics that best match the determined one or more characteristics. The determined parameter values are responsive to random variation in one or more parameters of the one or more structures on the specimen. The steps of the method are performed by a computer subsystem coupled to the output acquisition subsystem.

An additional embodiment relates to a computer-implemented method for determining random variation in one or more structures on a specimen. This method includes generating output for one or more structures formed on a specimen (e.g., with an output acquisition subsystem configured as described herein). This method also includes determining random variation in one or more parameters of the one or more structures formed on the specimen based on the generated output with a ML model. The ML model is included in one or more components executable on a computer subsystem coupled to the output acquisition subsystem.

Each of the steps of the methods may be performed as described further herein. The methods may also include any other step(s) that can be performed by the system, output acquisition subsystem, ML model, component(s), and computer subsystem described herein. The system, output acquisition subsystem, ML model, component(s), and computer subsystem may be configured according to any of the embodiments described herein. The methods may be performed by any of the system embodiments described herein.

Figure 17:
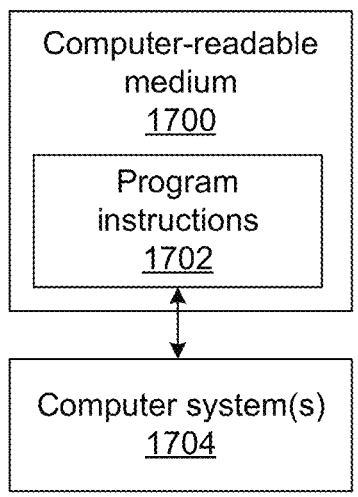
FIG. 17 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 17. In particular, as shown in FIG. 17, non-transitory computer-readable medium 1700 includes program instructions 1702 executable on computer system(s) 1704. The computer-implemented method includes the steps described above. The computer-implemented method may further include any step(s) of any method(s) described herein.

Program instructions 1702 implementing methods such as those described herein may be stored on computer-readable medium 1700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 1704 may be configured according to any of the embodiments described herein.

Further modifications and alternative embodiments of various aspects of the invention will be apparent to those skilled in the art in view of this description. For example, methods and systems for determining random variation in one or more structures on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining random variation in one or more structures formed on a specimen, comprising:
an output acquisition subsystem configured for generating output for one or more structures formed on a specimen, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy; and
a computer subsystem configured for:
determining one or more characteristics of the output generated for the one or more structures;
simulating the one or more characteristics of the output with parameter values for the one or more structures;

determining parameter values of the one or more structures formed on the specimen as the parameter values that resulted in the simulated one or more characteristics that best match the determined one or more characteristics, wherein the determined parameter values are responsive to random variation in one or more parameters of the one or more structures on the specimen, and wherein the random variation comprises randomness in geometric parameters, material parameters, or geometric and material parameters of the one or more structures on the specimen; and altering a process that was or will be performed on the specimen based on the determined parameter values.

2. The system of claim 1, wherein the one or more characteristics of the output are responsive to the random variation in the one or more parameters of the one or more structures as formed on the specimen according to an arbitrary statistical distribution of random degrees of freedom parameterized by a user a priori and sampled by a quasirandom or pseudorandom distribution defining one supercell structure larger than the one or more structures or an ensemble thereof.

3. The system of claim 1, wherein the computer subsystem is further configured for determining an arbitrary statistical distribution of aperiodic degrees of freedom comprising arbitrary characteristics, wherein the arbitrary characteristics comprise one or more of correlations and non-Gaussian distributions, by sampling the arbitrary statistical distribution by a quadrature defined by quasirandom or pseudorandom numbers.

4. The system of claim 1, wherein the random variations in the one or more parameters are parameterized by one number per each of the one or more parameters of the one or more structures, and wherein the one number is an arbitrary single parameter.

5. The system of claim 4, wherein a probability distribution that describes the random variation is a Gaussian distribution, dual-Gaussian distribution, uniform distribution, skewed Gaussian distribution, or Poisson distribution.

6. The system of claim 4, wherein a probability distribution that describes the random variation comprises a correlation predetermined by a user a priori such that one value of the arbitrary single parameter for each geometric critical dimension parameter of the one or more parameters is sufficient for describing a correlated multi-parameter distribution.

7. The system of claim 1, wherein the simulating is performed with a super-cell model having an arbitrary number of unit cells in x and y directions, and wherein x and y are nominal periodic directions of the structure.

8. The system of claim 7, wherein the simulating is further performed with an ensemble of independent instances of the super-cell model, and wherein the simulating comprises averaging results of the simulating for the ensemble according to a weighted average formula.

9. The system of claim 8, wherein values of the arbitrary number of the unit cells in the x and y directions and a size of the ensemble are automated to reach a predetermined accuracy, a predetermined speed, a predetermined robustness, or a combination thereof of the results of the simulating.

10. The system of claim 8, wherein the super-cell model or the ensemble is designed to describe long-range correlations in the random variation in the one or more parameters of the one or more structures formed on the specimen.

11. The system of claim 1, wherein said simulating comprises simulating the output with a forward model configured for performing a regression technique.

12. The system of claim 1, wherein the computer subsystem is further configured for identifying a first of the one or more characteristics of the output that is more responsive to at least one of the parameter values than a second of the one or more characteristics of the output, and wherein determining the one or more characteristics, simulating the one or more characteristics, and determining the parameter values are performed with only the first of the one or more characteristics.

13. The system of claim 1, further comprising one or more components executed by the computer subsystem, wherein the one or more components comprise an electromagnetic solver configured for performing said simulating.

14. The system of claim 1, further comprising one or more components executed by the computer subsystem, wherein the one or more components comprise a model-based machine learning model configured for fitting the one or more characteristics of the output as a function of the parameter values with which said simulating is performed.

15. The system of claim 1, wherein said simulating is performed with a machine learning model trained with synthetic and real spectra, and wherein the real spectra are collected with a sampling selected so that a statistical distribution describing the random variation is determined per die on a training specimen.

16. The system of claim 1, wherein the computer subsystem is further configured for determining a probability distribution that describes the random variation by collecting electrical testing results from multiple devices within one die on an additional specimen and generating an electrical testing Gaussian distribution from the electrical testing results.

17. The system of claim 1, wherein the output is further responsive to x-rays from the specimen, and wherein the one or more characteristics of the output comprise diffuse scattering and diffraction order intensities.

18. The system of claim 17, wherein said simulating comprises calculating diffuse and specular scattering responsive to the random variation by averaging results of electromagnetic simulations over an ensemble of supercell profiles, determining a diffuse scattering from the averaged results, and determining a diffuse scattering detector signal by interpolation of the determined diffuse scattering.

19. The system of claim 18, wherein said simulating further comprises determining a diffraction detector signal from the averaged results and determining a full detector signal by combining the diffuse scattering detector signal and the diffraction detector signal.

20. The system of claim 17, wherein determining the one or more characteristics comprises removing diffraction orders from the output to thereby extract the output responsive to only the diffuse scattering in the output.

21. The system of claim 17, wherein the output comprises a full x-ray signal, and wherein determining the one or more characteristics comprises matching the full x-ray signal with a beam shape describing both the diffraction order intensities and the diffuse scattering.

22. The system of claim 17, wherein the computer subsystem is further configured for determining additional parameter values of the one or more structures from additional output generated by the output acquisition subsystem for the one or more structures, wherein the additional parameter values comprise values of one or more of the geometric parameters of the one or more structures that are not responsive to the random variation in the one or more structures, and wherein the output acquisition subsystem further comprises a mask blocking one or more regions of the detector between diffraction orders in the x-rays from the specimen during generation of the additional output.

23. The system of claim 1, wherein the output generated by the output acquisition subsystem is further responsive to light from the specimen, and wherein the one or more characteristics comprise depolarization in the light.

24. The system of claim 23, wherein said simulating comprises simulating the output generated for the one or more structures with the parameter values, wherein the simulated output is a Mueller Matrix as a function of wavelength, and wherein said simulating further comprises calculating an averaged Mueller Matrix function from the Mueller Matrix and calculating the depolarization in the light from the averaged Mueller Matrix function.

25. The system of claim 24, wherein said simulating is performed by regression with a cost function based on a weighted average of depolarization cost and Mueller Matrix cost.

26. The system of claim 23, wherein said simulating is performed by regression with a cost function based on only depolarization cost.

27. A non-transitory computer-readable medium, storing program instructions executable on a computer system for performing a computer-implemented method for determining random variation in one or more structures on a specimen, wherein the computer-implemented method comprises:
   determining one or more characteristics of output generated by an output acquisition subsystem for one or more structures formed on a specimen, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy;
   simulating the one or more characteristics of the output with parameter values for the one or more structures;
   determining parameter values of the one or more structures formed on the specimen as the parameter values that resulted in the simulated one or more characteristics that best match the determined one or more characteristics, wherein the determined parameter values are responsive to random variation in one or more parameters of the one or more structures on the specimen, and wherein the random variation comprises randomness in geometric parameters, material parameters, or geometric and material parameters of the one or more structures on the specimen; and
   altering a process that was or will be performed on the specimen based on the determined parameter values.

28. A computer-implemented method for determining random variation in one or more structures on a specimen, comprising:
   determining one or more characteristics of output generated by an output acquisition subsystem for one or more structures formed on a specimen, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy;
   simulating the one or more characteristics of the output with parameter values for the one or more structures;
   determining parameter values of the one or more structures formed on the specimen as the parameter values that resulted in the simulated one or more characteristics that best match the determined one or more characteristics, wherein the determined parameter values are responsive to random variation in one or more parameters of the one or more structures on the specimen, and wherein the random variation comprises randomness in geometric parameters, material parameters, or geometric and material parameters of the one or more structures on the specimen; and
   altering a process that was or will be performed on the specimen based on the determined parameter values, wherein said determining the one or more characteristics, simulating the one or more characteristics, determining the parameter values, and altering the process are performed by a computer subsystem coupled to the output acquisition subsystem.

29. A system configured for determining random variation in one or more structures formed on a specimen, comprising:
   an output acquisition subsystem configured for generating output for one or more structures formed on a specimen, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy; and
   one or more components executable on a computer subsystem coupled to the output acquisition subsystem, wherein the one or more components comprise a machine learning model configured for determining random variation in one or more parameters of the one or more structures formed on the specimen based on the generated output, wherein the random variation comprises randomness in geometric parameters, material parameters, or geometric and material parameters of the one or more structures on the specimen, and wherein the computer subsystem is configured for altering a process that was or will be performed on the specimen based on the determined random variation.

30. The system of claim 29, wherein the machine learning model is a model-based machine learning model.

31. The system of claim 29, wherein the machine learning model is a model-free machine learning model.

32. The system of claim 29, wherein the machine learning model is trained with synthetic and real spectra, and wherein the real spectra are collected with a sampling selected so that a statistical distribution describing the random variation is determined per die on a training specimen.

33. The system of claim 29, wherein the computer subsystem is further configured for determining a probability distribution that describes the random variation by collecting electrical testing results from multiple devices within one die on an additional specimen and generating an electrical testing Gaussian distribution from the electrical testing results.

34. The system of claim 29, wherein the output is responsive to x-rays from the specimen, wherein the machine learning model is further configured for determining one or more characteristics of the output generated for the one or more structures, and wherein the one or more characteristics of the output comprise diffuse scattering and diffraction order intensities.

35. The system of claim 34, wherein determining the one or more characteristics comprises removing diffraction orders from the output to thereby extract the output responsive to only the diffuse scattering in the output.

36. The system of claim 34, wherein the machine learning model is further configured for determining additional parameter values of the one or more structures from additional output generated by the output acquisition subsystem for the one or more structures, wherein the additional parameter values comprise values of one or more of the geometric parameters of the one or more structures that are not responsive to the random variation in the one or more structures, and wherein the output acquisition subsystem comprises a mask blocking one or more regions of a detector between diffraction orders in the x-rays from the specimen during generation of the additional output.

37. The system of claim 29, wherein the output generated by the output acquisition subsystem is further responsive to light from the specimen, wherein the machine learning model is further configured for determining one or more characteristics of the output generated for the one or more structures, and wherein the one or more characteristics comprise depolarization in the light.

38. A computer-implemented method for determining random variation in one or more structures formed on a specimen, comprising:
   generating output for one or more structures formed on a specimen with an output acquisition subsystem, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy;
   determining random variation in one or more parameters of the one or more structures formed on the specimen based on the generated output with a machine learning model, wherein the machine learning model is included in one or more components executable on a computer subsystem coupled to the output acquisition subsystem, and wherein the random variation comprises randomness in geometric parameters, material parameters, or geometric and material parameters of the one or more structures on the specimen; and
   altering a process that was or will be performed on the specimen based on the determined random variation, wherein said altering is performed by the computer subsystem.

39. A non-transitory computer-readable medium, storing program instructions executable on a computer system for performing a computer-implemented method for determining random variation in one or more structures on a specimen, wherein the computer-implemented method comprises:
   generating output for one or more structures formed on a specimen with an output acquisition subsystem, wherein the output acquisition subsystem comprises at least an energy source and a detector, wherein the energy source is configured to generate energy that is directed to the specimen by the output acquisition subsystem, and wherein the detector is configured to detect energy from the specimen and to generate the output responsive to the detected energy;
   determining random variation in one or more parameters of the one or more structures formed on the specimen based on the generated output with a machine learning model, wherein the machine learning model is included in one or more components executable on the computer system coupled to the output acquisition subsystem, and wherein the random variation comprises randomness in geometric parameters, material parameters, or geometric and material parameters of the one or more structures on the specimen; and
   altering a process that was or will be performed on the specimen based on the determined random variation.

* * * * *